(12) United States Patent
Bennett et al.

(10) Patent No.: US 8,605,288 B2
(45) Date of Patent: Dec. 10, 2013

(54) OPTICAL SYSTEM FOR CREATING INTERFERENCE BETWEEN PHOTONS

(75) Inventors: Anthony John Bennett, Cambridge (GB); Richard Mark Stevenson, Cambridge (GB); Andrew James Shields, Cambridge (GB)

(73) Assignee: Kaubushiki Kaisha Toshiba, Tokyo (JP)

( * ) Notice: Subject to any disclaimer, the term of this patent is extended or adjusted under 35 U.S.C. 154(b) by 719 days.

(21) Appl. No.: 12/600,598

(22) PCT Filed: May 16, 2008

(86) PCT No.: PCT/GB2008/001704
§ 371 (c)(1),
(2), (4) Date: Jan. 6, 2010

(87) PCT Pub. No.: WO2008/142389
PCT Pub. Date: Nov. 27, 2008

(65) Prior Publication Data
US 2010/0157310 A1  Jun. 24, 2010

(30) Foreign Application Priority Data

May 17, 2007  (GB) .................................. 0709524.3

(51) Int. Cl.
*G01B 9/02* (2006.01)
(52) U.S. Cl.
USPC ........................................................ 356/483
(58) Field of Classification Search
USPC .......... 356/460, 466, 459, 483, 491; 380/263, 380/278
See application file for complete search history.

(56) References Cited

U.S. PATENT DOCUMENTS

| | | | |
|---|---|---|---|
| 5,402,231 A * | 3/1995 | Udd | 356/460 |
| 5,677,767 A * | 10/1997 | Shirasaki et al. | 356/460 |
| 6,897,434 B1 | 5/2005 | Kumar et al. | |
| 7,034,946 B2 * | 4/2006 | Chen et al. | 356/466 |

(Continued)

FOREIGN PATENT DOCUMENTS

| | | |
|---|---|---|
| GB | 2 379 847 A | 3/2003 |
| GB | 2 405 294 A | 2/2005 |

(Continued)

OTHER PUBLICATIONS

Irfan Ali Khan, et al., "Experimental Demonstration of High Dimensional Time-Energy Entangled Two-Photon States". Quantum Electronics and Laser Science Conference (QELS), vol. 1, XP010887310, May 22, 2005, pp. 295-297.

(Continued)

*Primary Examiner* — Michael A Lyons
*Assistant Examiner* — Jonathan Hansen
(74) *Attorney, Agent, or Firm* — Oblon, Spivak, McClelland, Maier & Neustadt, L.L.P.

(57) ABSTRACT

An optical system including: a photon source; first directing elements configured to direct photons to follow a first path through the optical system; second directing elements configured to direct photons to follow a second path through the optical system, wherein the second path is the reverse of the first path, photons travelling through the first path having a different polarization to those travelling through the second path; and a mechanism varying the relative phase shift between photons following the first path and photons following the second path.

10 Claims, 22 Drawing Sheets

(56) References Cited

U.S. PATENT DOCUMENTS

| | | | |
|---|---|---|---|
| 7,346,166 B2 * | 3/2008 | Inoue et al. | 380/263 |
| 2004/0095582 A1 | 5/2004 | Holbrook | |
| 2008/0285046 A1 * | 11/2008 | Fullerton | 356/459 |

FOREIGN PATENT DOCUMENTS

| WO | WO 94/06224 A2 | 3/1994 |
|---|---|---|
| WO | WO 94/06224 A3 | 3/1994 |
| WO | WO 00/75730 A1 | 12/2000 |
| WO | WO 2004/073228 A2 | 8/2004 |
| WO | WO 2004/073228 A3 | 8/2004 |
| WO | WO 2005/067189 A1 | 7/2005 |
| WO | WO 2005/092071 A2 | 10/2005 |

OTHER PUBLICATIONS

Prem Kumar, et al., "Fiber-Optic Sources of Quantum Entanglement", Center for Photonic Communication and Computing, ECE Department Northwestern University, Available from <http://arxiv.org/PS_cache/quant-ph/pdf/0209/0209112v1.pdf>, pp. 1-6.

Office Action mailed Apr. 2, 2013 in Japanese Application No. 2010-507983 (w/English translation).

J. D. Franson, Bell Inequality for Position and Time, Physical Review Letters, May 8, 1989, vol. 62, No. 19, pp. 2205-2208.

\* cited by examiner

OPTICAL SYSTEM FOR CREATING INTERFERENCE BETWEEN PHOTONS

The present invention relates to the field of optical system which are used for creating interference between photons. More specifically, the present invention relates to an optical system which can interfere photons in order to exploit their properties at the quantum level for a vast variety of uses.

Interferometry is a key part of quantum mechanics experiments that allows exploitation of one of the most counter-intuitive features of quantum mechanics, namely multi-particle superposition. A famous example of superposition is the entanglement of two particles where the measurement of one instantaneously determines the state of the other particle.

However, many experiments which exploit the superposition of states require finely balanced multiple interferometers, the use of which may be hindered by classical physical phenomena such as drift in the positions of the interferometers, caused by temperature variations, strain etc. These issues have been addressed by variable delay lines, active-stabilisation etc, but this requires extra components and sometimes complicated operating procedures.

The present invention at least partially addresses the above problems and in a first aspect provides an optical system comprising a photon source, first directing elements configured to direct photons to follow a first path through said optical system, second directing elements configured to direct photons to follow a second path through said optical system wherein said second path is the reverse of said first path, the system being configured such that photons travelling through the first path have a different polarisation to those travelling through the second path and a means of varying the relative phase shift between photons following the first path and photons following the second path.

Thus, by allowing photons to travel through the same interferometer in opposite directions, as opposed to two separate interferometers, problems due to drift are eliminated.

The source is preferably a non-classical light source, for example, a dedicated single photon source or an attenuated laser or LED which can output attenuated pulses capable of carrying quantum information. In the later case the pulses contain a statistical mix of N=0, 1 and 2 photon etc states. Alternatively, the source may emit Fock states (groups of n photons where n is an integer of at least 1).

In some embodiments the first path comprises a plurality of sub-paths connected in parallel and said second path comprises the reverse of the plurality of sub-paths. This plurality of sub-paths can form a Mach Zehnder Interferometer.

If photons are emitted by the source with a predetermined time interval, dt, it is possible to use the system to superpose two photons emitted with a time interval dt, by delaying photons which travel through one of the sub-paths by a time dt with respect to the other sub-path. Entanglement of the photons in position and time will occur if the photons emitted by the source are identical.

There may be two sub-paths which form the plurality of paths. This will allow qubits to be formed as each photon occupies a superposition of 2 states, one state corresponding to a photon taking one sub-path and the other state corresponding to the photon taking the other subpath.

In a further embodiment, N sub-paths form the plurality of paths, where N is an integer of at least 2. This allows quNits to be formed by a photon occupying a state which is a superposition of N states corresponding to each of the N paths.

Preferably at least N−1 of the N arms contain a polarisation dependent phase shift element.

The system may be configured to handle bi-photons which comprise 2 photons. In such a system, the source is configured to output bi-photons and said first directing elements are configured to direct biphotons and said second directing elements are configured to direct bi-photons.

A source may be used which is also configured to emit non-degenerate entangled photons. The system may then be used to further entangle the photons in phase or to check the integrity of the entangled source.

The system can be used to superpose phase states and entangle photons. As it is necessary to have photons with one polarisation following one path and photons with a different polarisation following the other path, some photons may not be used in the system, since it is necessary to have a photon with a particular polarisation following a particular path at a particular time. The efficiency of the system can be improved by using a source which is configured to generate a state which is entangled in polarisation and which is a superposition of a first state with a vertically polarised photon and horizontally polarised photon emitted at a first time interval after the vertically polarised photon and a second state with a horizontally polarised photon and a vertically polarised photon emitted after the first time interval.

Another way to improve the efficiency of the system is to use a system which further comprises a third path for said photons and a fourth path for photons, wherein the fourth path is the reverse of the third path, the system being configured such that photons travelling through the third path have a different polarisation to those travelling through the fourth path and a means of varying the relative phase shift between photons following the third path and photons following the fourth path, the system further comprising means to direct photons either along said first path or the third path depending on their polarisation and means to direct photons either along said second path or the fourth path depending on their polarisation.

The above arrangement allows photons which would have otherwise been lost because they have arrived at the first path with an incorrect polarisation to be directed along the third path.

The above system may be configured for quantum communication between at least two parties, the system further comprising a first detection system located at the first party, the first detection system being configured to determine a quantum state of a photon received by the first party, the system further comprising a second detection system located at the second party, the second detection system being configured to determine a quantum state of a photon received by the second party, said means for applying a relative phase shift comprising a controllable birefringent phase modulator.

In one embodiment, the system further comprises first communication means configured to direct carriers which have followed said first path to said first party and second communication means configured to direct carriers which have followed said second path to said second party. Thus, both parties remain external to the first and second paths.

In a further embodiment, the first and second paths are divided between the two parties and the phase varying means comprises a first phase modulator and a second phase modulator, the first phase modulator operating under control of the first party and the second phase modulator operating under control of the second party.

The system may also be configured for investigation or imaging of an object, said system comprising a first polarising beam splitter located in said first path configured to direct photons having a first polarisation to impinge on said object and photons having a second polarisation to bypass said object, said beams being recombined at a second polarising beam splitter which also direct photons having a first polarisation to impinge on said object and photons having a second polarisation to bypass said object.

The system may be configured to image or investigate the object in transmission or reflection.

The system may also be configured as a gyroscope, wherein photons both enter and exit the first and second paths at the same point and phase variation is achieved by physical rotation of the first and second paths. By physical rotation of the first and second paths, the optical length of the paths varies and hence rotation may be detected.

As previously mentioned, the present invention may be used to examine an entangled photon source, said system comprising a source of polarisation entangled photons and being configured such that, means to convert said polarisation entanglement into phase entanglement, wherein out of a pair of entangled photons, one photon is directed to follow the first path and the other is directed to follow the second path, wherein said phase variation means is a phase modulator configured to introduce a phase difference such that it is possible to predict the exits paths of the photons from the first and second paths if said source is fully entangled.

In summary, possible examples of the means for varying the relative phase shift are birefringent elements, means to moveably mount a sample in at least one path, for example as used when imaging or investigating a sample, or a mobile mount for the first path and second path, for example as used when operating as a gyroscope.

Preferably the system will comprise a first detector for detecting photons which have followed said first path, a second detector for detecting photons which have followed said second path and means to correlate the results of said first and second detectors. This arrangement allows events where entanglement was achieved to be identified. These events can then be post selected during analysis.

Where bi photons are used in the system, biphoton detectors are used to register detection events.

In a second aspect, the present invention provides a method of interfering photons, the method comprising directing photons having a first polarisation to follow a first path while simultaneously directing photons having a second polarisation to follow a second path which is the reverse of said first path, and varying the relative phase shift between photons following the first path and photons following the second path.

The method preferably further comprises measuring the correlation of photons which exit the first and second paths.

The present invention will now be described with references following non-limited embodiments in which:

FIG. 1 is a schematic of a so-called Franson type interferometer in accordance with the prior art. The Franson type interferometer is explained in detail in Franson Phys Rev Lett 62 2205 to 2208 (1989).

Figure 1:
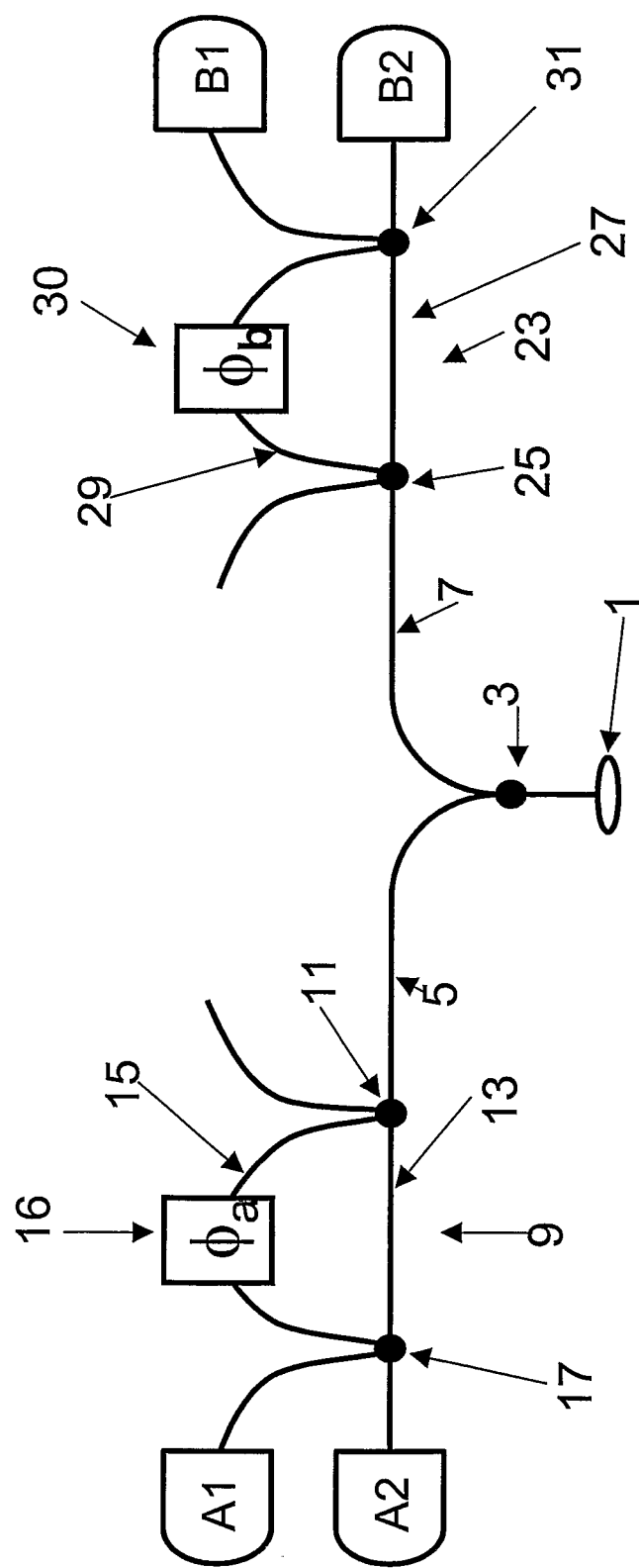
FIG. 1 is a schematic of a prior art interferometer which has been used to demonstrate position and time entanglement.

In the Franson experiment, a source 1 is configured to output photons in short succession. A beam splitter 3 is provided which allows photons from the source 1 to be either directed along first path 5 or second path 7. The beam splitter 3 is a non-polarising beam splitter. In other words it randomly directs photons down either the first path 5 or the second path 7 regardless of their polarisation.

Photons travelling down first path 5 are directed into first Mach Zehnder interferometer (MZI) 9. First MZI 9 comprises a non-polarising beam splitter 11. The beam splitter 11 either directs photons along short arm 13 or long arm 15. The long arm 15 contains a phase modulator 16 which applies a phase modulation of $\phi_a$ to photons travelling along this arm. The outputs of short arm 13 and long arm 15 are then combined at beam splitter 17. Photons are then directed to first detector A1 or second detector A2.

Similarly, photons directed down second arm 7 are directed into second MZI 23. Second MZI 23 comprises a first beam splitter 25 which directs photons either along short arm 27 or long arm 29. The long arm 29 contains second phase modulator 30 which applies a phase shift of $\phi_b$ to photons travelling along this arm. The output of short arm 27 and long arm 29 are then combined at second beam splitter 31. Second beam splitter 31 either directs photons into first detector B1 or second detector B2.

If the source 1 outputs photons which are identical, with a time delay of dt between the two photons and dt corresponds to the time delay in photons travelling between the short arm 13 and long arm 15 of the first MZI 9 and the time delay of the short arm 27 and the long arm 29 of the second MZI 23, then there will be a correlation between the two photons. The correlation will occur if one photon is directed through the first interferometer and the next photon which is emitted is directed through the second interferometer (or vice versa). The correlation will depend on the difference between the phase applied by the phase modulators 16 and 30.

If two photons are simultaneously detected on opposite sides of the system i.e. at pairs (A1, B1) (A1, B2), (A2, B1) or (A2, B2) then it must be that the two photons left coupler 3 in opposite directions and that they took paths through the MZIs 9 and 23 that generated entanglement. Thus by studying only events where two photons are detected simultaneously at these pairings we have "post-selected" events where entanglement was generated.

However, a problem of the above system is that it is necessary for the two MZIs 9 and 23 to be identical in terms of the delay which they provide and also they need to be stable over time. This is difficult as thermo drifting and changes in fibre strain/position occurs which affects the path difference, and therefore the phase difference, between the short arm and the long arm of each MZI 9 and 23.

Figure 2:
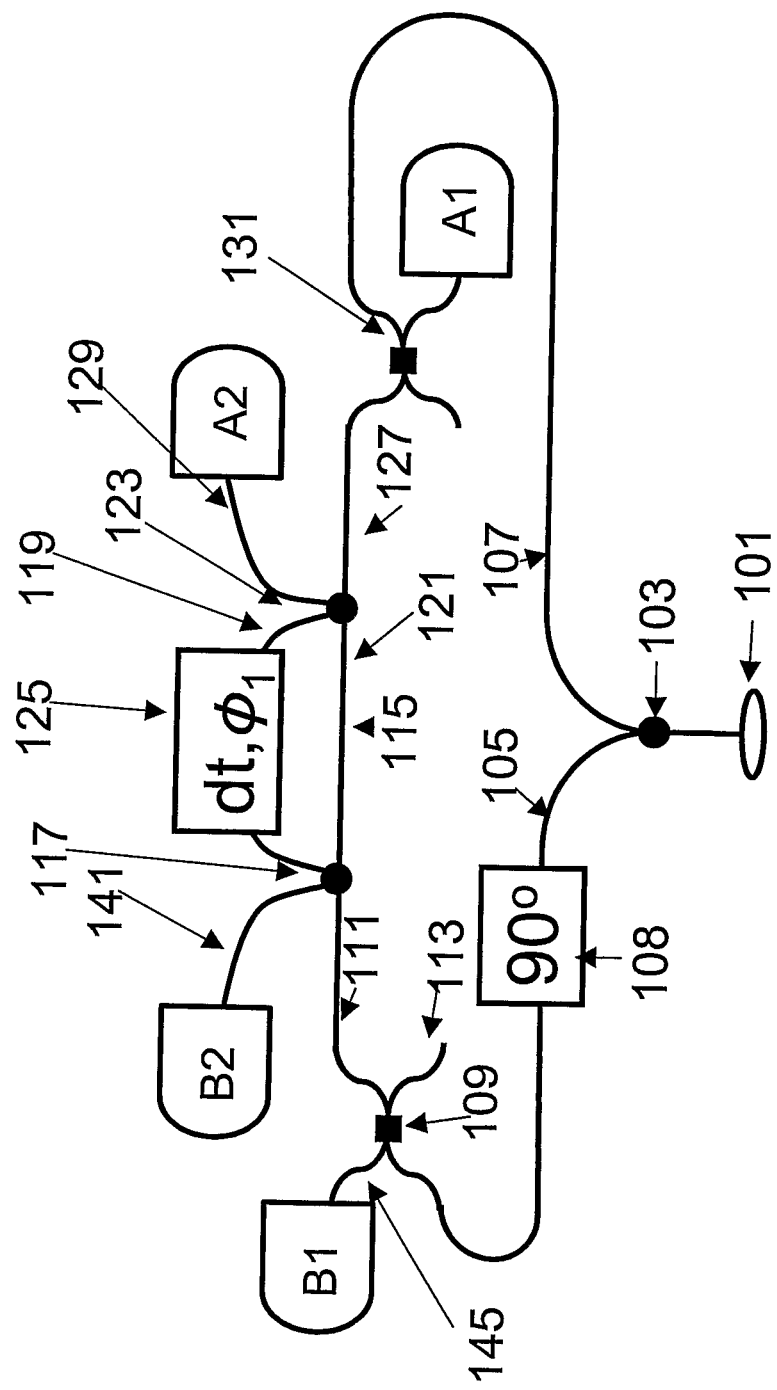
FIG. 2 is a schematic of an interferometer in accordance with an embodiment of the present invention.

FIG. 2 shows an interferometer in accordance with an embodiment of the present invention. The interferometer of FIG. 2 is based on that of FIG. 1. However, in the interferometer of FIG. 2, instead of two MZIs 9 and 23, a single MZI is provided and photons are which are to interfere are sent through the single MZI in opposite directions. $\Phi_1$ applies a phase shift that is different for H and V As for FIG. 1, a source 101 outputs H polarised photons with a separation of time dt. The photons are passed into non-polarising beam splitter 103. Non-polarising beam splitter 103 sends photons randomly either down arm 105 or down arm 107. Photons in arm 105 then pass into polarisation rotator 108 which rotates the polarisation by 90° to be vertical V.

The photons are then directed to polarising beam splitter 109. Polarising beamsplitter 109 transmits all photons with a polarisation V along arm 111. This means photons with a polarisation V are then transmitted into MZI 115. MZI 115 comprises a non-polarising beam splitter 117 which directs photons randomly either into long arm 119 or short arm 121. The photons output from the long arm 119 or the short arm 121 are then combined using non-polarising beam splitter 123.

A first modulator 125 is provided in the long arm. This allows a variation of the phase of photons travelling through the long arm to be introduced relative to those travelling through the short arm. The variation in time which it takes a photon to travel through the long arm versus that of the short arm 121 represented by dt.

Photons which are outputted to second junction 123 will either be directed through arm 127 or arm 129. Photons which are directed through arm 127 will have a vertical polarisation and will impinge on polarising beam splitter 131. As these photons are transmitted they will be directed to detector A1. Photons which are redirected through arm 129 will be measured at detector A2. Therefore, photons follow an essentially equivalent path to path 5 of FIG. 1.

Photons which follow path 107 impinge on polarising beam splitter 131 and H polarised photons are directed into arm 127. Photons with H polarisation then impinge on non-polarising beam splitter 123 which serves to direct the photons down either long arm 119 or short arm 121 of the interferometer 115.

The photons are then combined at beam splitter 117 and are either redirected into arm 141 towards detector B2 or through arm 145 which as the photon are horizontally polarised will result in them being directed towards the detector B1.

The first modulator 125 is a birefringent element which can vary the phase experienced by photons travelling from left to right by a different amount to those travelling from right to left. This is achieved because the birefringent element varies the phase of vertically polarised photons by a different amount to that of horizontally polarised photons.

Any drift in the phase difference between the two arms of the interferometer automatically affects both the leftward and rightward travelling photons equally and can thus be ignored. The correlation between the detectors varies as the difference $\Delta\phi$ between the phase modulation applied by phase modulator 125 for vertically polarised photons and the phase modulation applied by the phase modulator 125 for horizontally polarised photons. The following equations show the probability of obtaining coincidence between certain pairs of detectors as a function of the phase difference $\Delta\phi$:

$$<\Psi_{A2:B2}|\Psi_{A2:B2}>\alpha\{1+\gamma^2\cos(\Delta\phi)\}$$

$$<\Psi_{A2:B1}|\Psi_{A2:B1}>\alpha\{1+\gamma^2\cos(\Delta\phi)\}$$

$$<\Psi_{A1:B2}|\Psi_{A1:B2}>\alpha\{1+\gamma^2\cos(\Delta\phi)\}$$

$$<\Psi_{A1:B1}|\Psi_{A1:B1}>\alpha\{1+\gamma^2\cos(\Delta\phi)\}$$

where $\gamma$ describes the degree of indistinguishability between the two photons' wavefunctions.

In the example of FIG. 2, polarisation maintaining fibres are used which preserve the polarisation of the H and V photons only. However, it is possible to implement the system using polarisation controllers, which are used to eliminate birefringence, and conventional single mode fibres.

Figure 3:
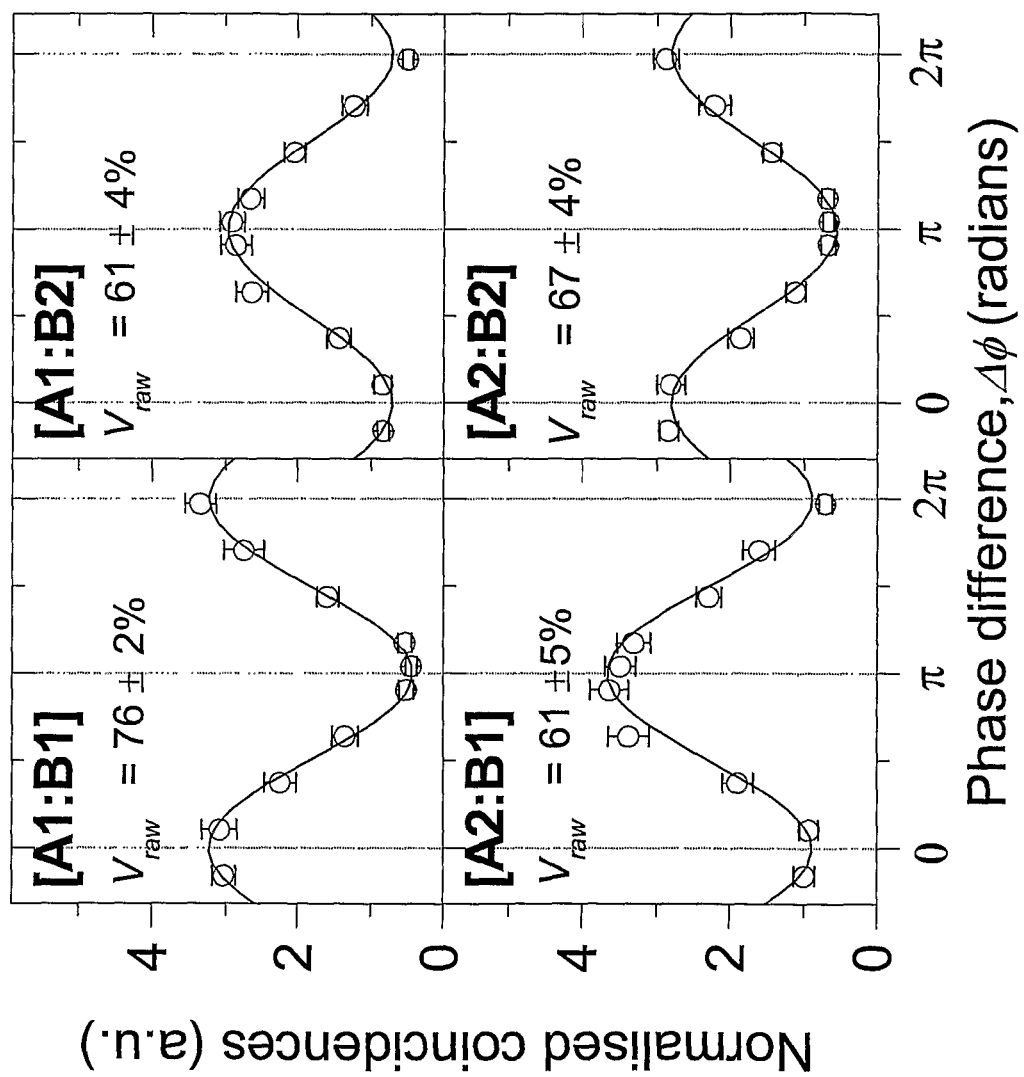
FIG. 3 are plots of experimental data showing correlation between the detectors in the system of FIG. 2.

FIG. 3 is four plots showing experimental data obtained using the interferometer shown in FIG. 2. Coincidence events where pairs of remote detectors count a photon simultaneously are shown as a function of the phase difference introduced by the birefringent element 125.

As the photon source, a InGaAs/GaAs quantum dot embedded in a micro-pillar was used. A linear polariser over the sample was used to pass H polarised photons to the experiment only. This produced indistinguishable single photons. Correlations were recorded between the four detectors as a function of the phase difference created in the interferometer. The finite visibility of the oscillations is determined by the unbalanced beam splitter reflection and transmission coefficients and the fact that the indistinguishability of the photons is less than 100%. Nevertheless, clear oscillations in the degree of correlation that are observed indicate a high degree of entanglement. It can be seen that the experimental results are in agreement with the above equations for correlation between the detectors.

In FIG. 2, a photon source delivers two indistinguishable photons e.g. same polarisation and same energy which are separated by a time delay dt which is equal to the time delay in the MZI. Interference occurs when the detection post-selects a state where one photon travels in one direction and the other in the opposite direction delayed by time dt (where dt is equal to the time delay in the MZI).

The system of FIG. 2 can operate with success probability of ⅛ if the source outputs photons having a polarisation of V or H, a linear polariser is provided over the source and the photons are output to a passive component such as a non-polarising beam splitter 103. A ⅛ probability is achieved because there is a 50% probability of the first photon being emitted with a polarisation which can be transmitted through the polariser, a 50% chance of the next photon being emitted with the same polarisation and a 50% chance that the photons will go down opposite arms as opposed to travelling down the same arm.

However, it maybe possible to configure a source which produces a state:

$$\text{Input}=|X_{V,l}(0)\rangle|X_{H,r}(dt)\rangle+|X_{V,l}(dt)\rangle|X_{H,r}(0)\rangle \quad (I)$$

Such a state is already entangled in polarisation and is a superposition of a state with a vertically polarised photon and horizontally polarised photon emitted at a time dt after the vertically polarised photon and a state with a horizontally polarised photon and a vertically polarised photon emitted after a time dt. Using this state the vertically polarised photon can be directed along left hand arm (1) 105 and the horizontally polarised photon along right hand arm 107.

Figure 4:
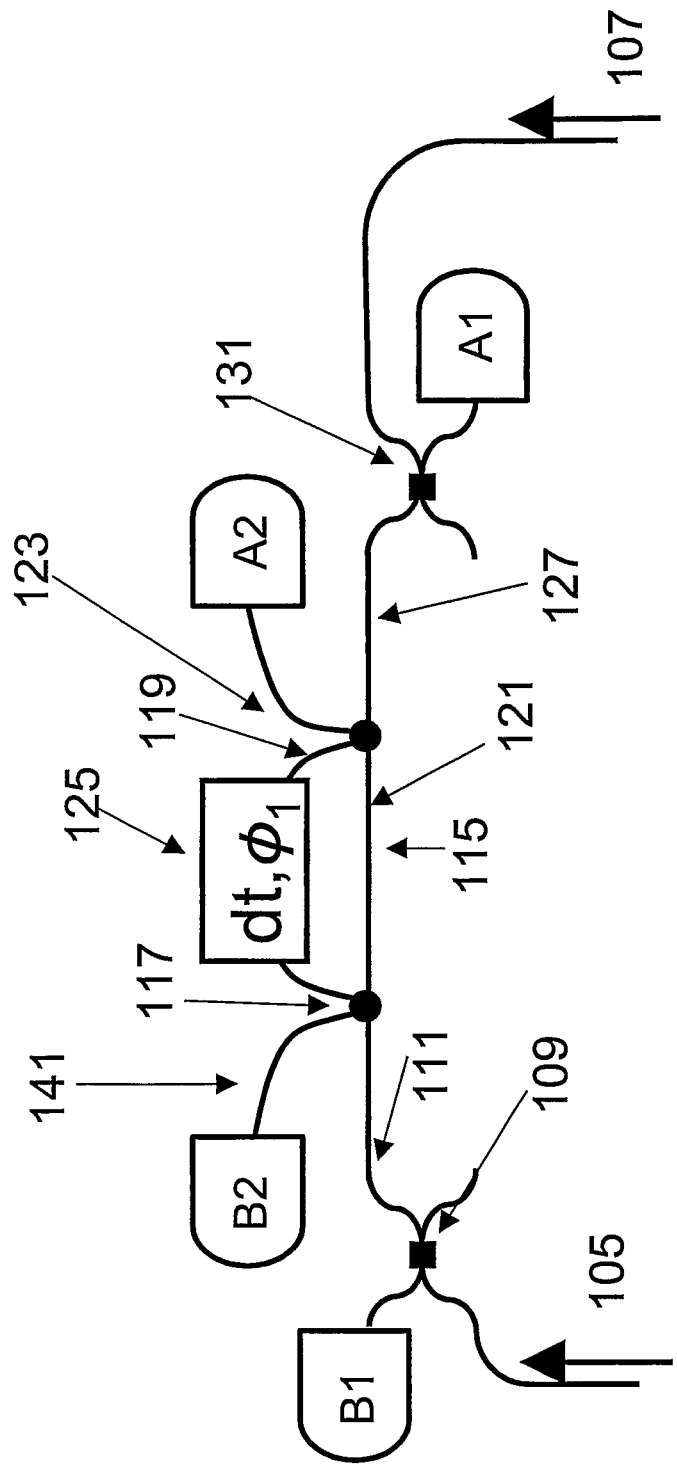
FIG. 4 is a schematic of an interferometer in accordance with an embodiment of the present invention used to create a phase entangled state from a generalised input state.

Such a state can then be sent into the interferometer 115 which is shown again in FIG. 4. To avoid unnecessary repetition, like reference numerals are used to denote like features.

Figure 5:
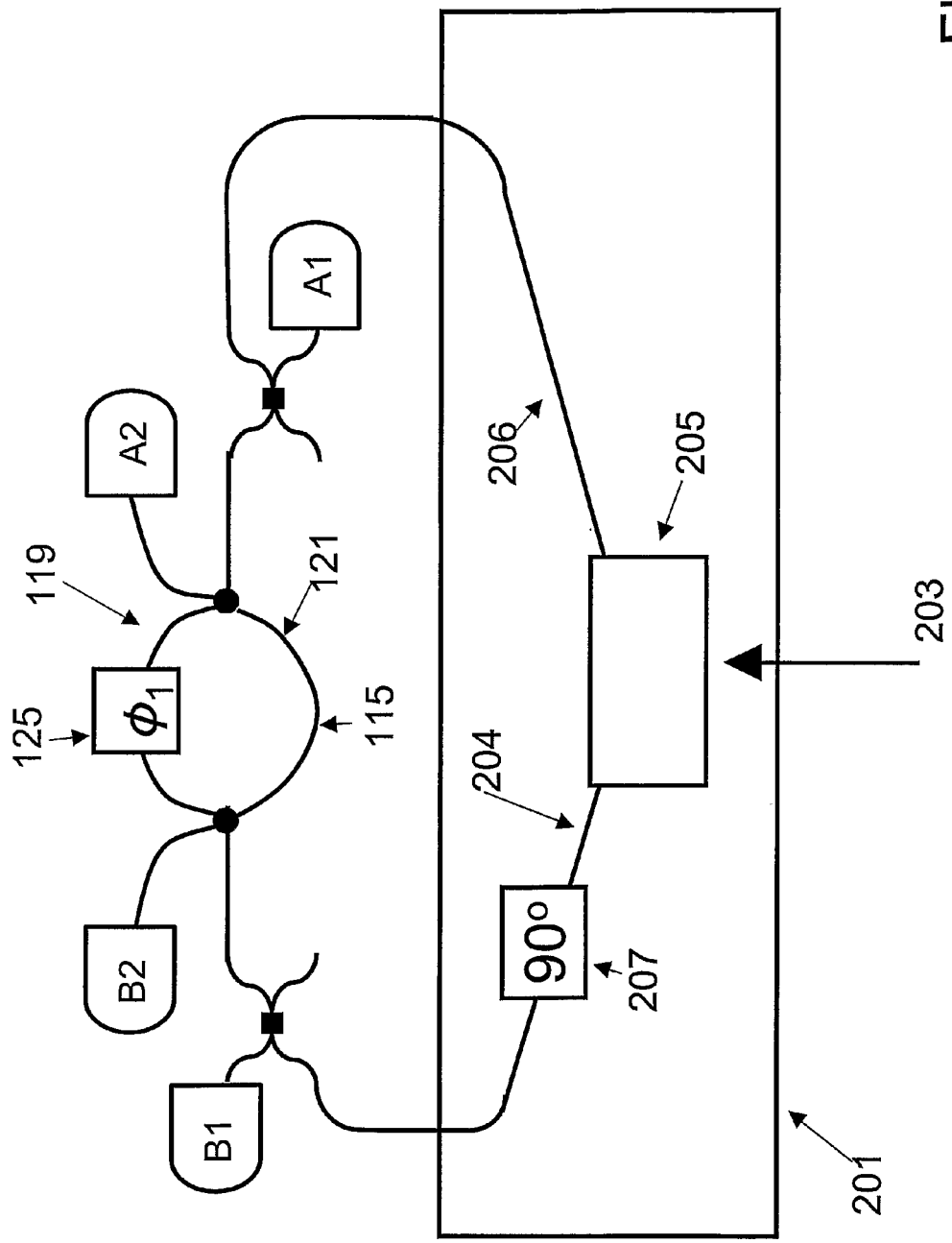
FIG. 5 is a schematic of a system used to create an entangled input state for the interferometer of FIG. 4.

FIG. 5 shows a schematic of the interferometer and detectors of FIG. 4 and an apparatus which can be used to generate the above input state (I) 201. To avoid unnecessary repetition, like reference numerals will be used to denote like features.

The apparatus 201 comprises a non-linear crystal 205 which can be used to generate photon pairs by spontaneous parametric down conversion. A pump photon 203 of energy E is split by crystal 205 which produces two photons having an energy of E/2 separated by time dt=0. The photons will have the same polarisation so a polarisation rotator 207 is required in first arm 204 in order to change the polarisation from the photons travelling in the second arm 206. In the interferometer 115, the time dt is set to 0 in other words the long arm 119 and the short arm 121 have the same length this is because the photons are emitted from the crystal 205 at exactly the same time and hence dt=0.

Figure 6:
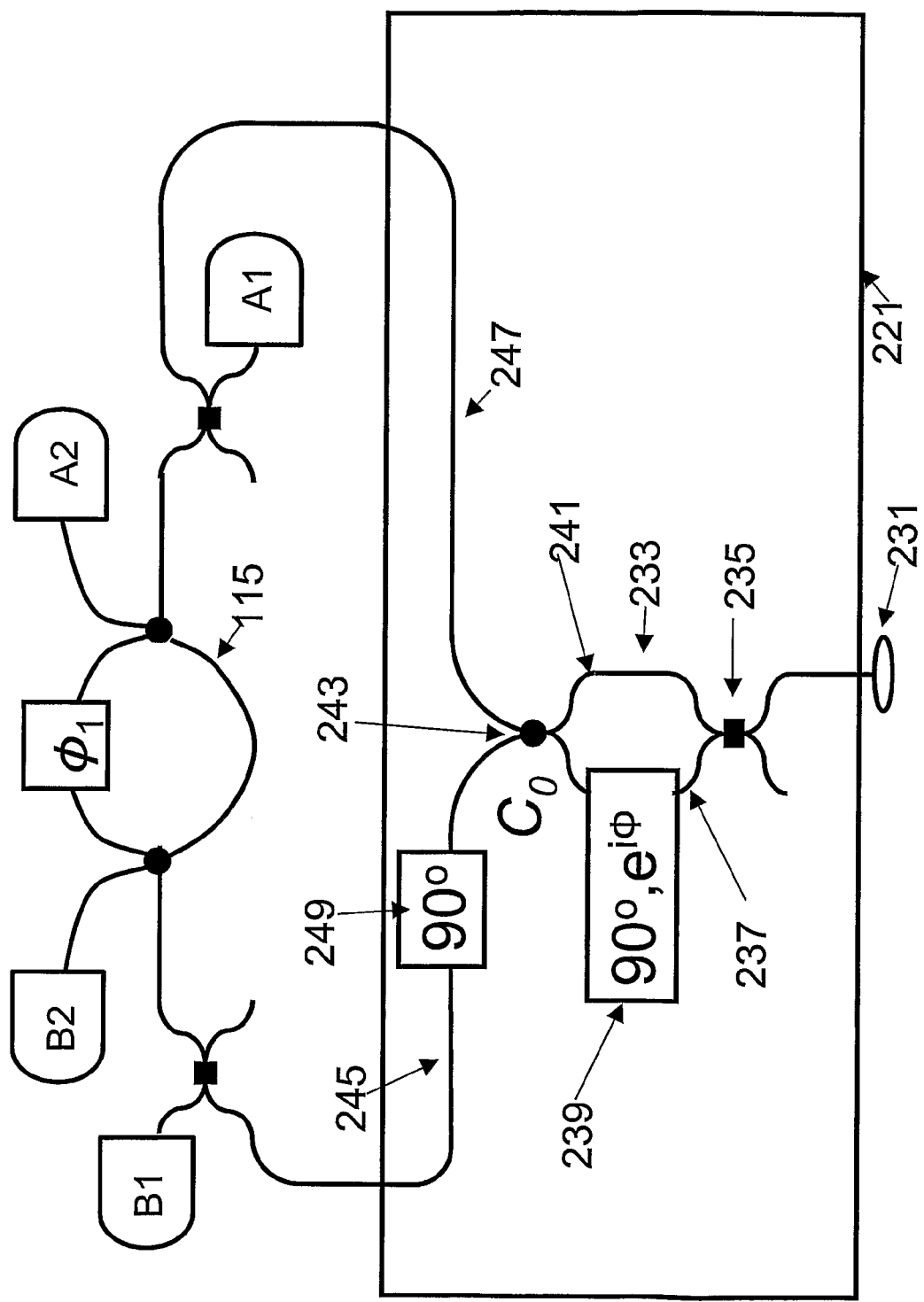
FIG. 6 is a schematic of an interferometer where the input state is created using a different method that is described with reference to FIG. 5.

FIG. 6 shows a schematic of the interferometer of FIG. 4 and an apparatus 221 which is configured to produce the above input state (I). To avoid any unnecessary repetition, like reference numerals will be used to denote like features.

Apparatus 221 is configured differently to that of the apparatus 201 of FIG. 5. However, it creates the same entangled input state.

Apparatus 221 of FIG. 6 comprises a single photon source 231 which outputs single photons into source interferometer 233. Source 231 produces photons with a state:

$$\text{Input}=|X_{V}(0)\rangle|X_{V}(0)\rangle+|X_{H}(0)\rangle|X_{H}(0)\rangle \quad (II)$$

In other words, either two horizontal photons are produced at the same time or are two vertically polarised photons are produced at the same time Source interferometer 233 comprises a polarising beam splitter 235, polarising beam splitter 235 in the configuration shown FIG. 6 directs photons with a vertical polarisation along arm 237 through phase modulator 239 and photons with a horizontal polarisation along arm 241 where there is no phase modulation By varying the phase applied by the phase modulator 239, it is possible for the pair of photons to leave the phase modulator and travel in opposite directions. If the applied phase is:

$$\Phi=\pi/2+N\pi$$

where N is an integer, then photons leave coupler $C_O$ 243 in opposite directions The photons which travel down arm 245 and 247 have the same polarisation. Therefore, polarisation rotator 249 is used to change the polarisation of one of the photons passing down on 245.

The photons are output at the same time and therefore they have a relative delay of dt=0. In order for the interferometer 115 to entangle the photons in position and time, the time delay in the interferometer (i.e. the path difference between the two arms) is set to 0.

In the interferometer of FIG. 2, many of the photons are discarded if they are not produced with the correct input state. However, it is also possible to obtain higher efficiencies by using an un-polarised source. Such an arrangement is shown in FIG. 7.

Figure 7:
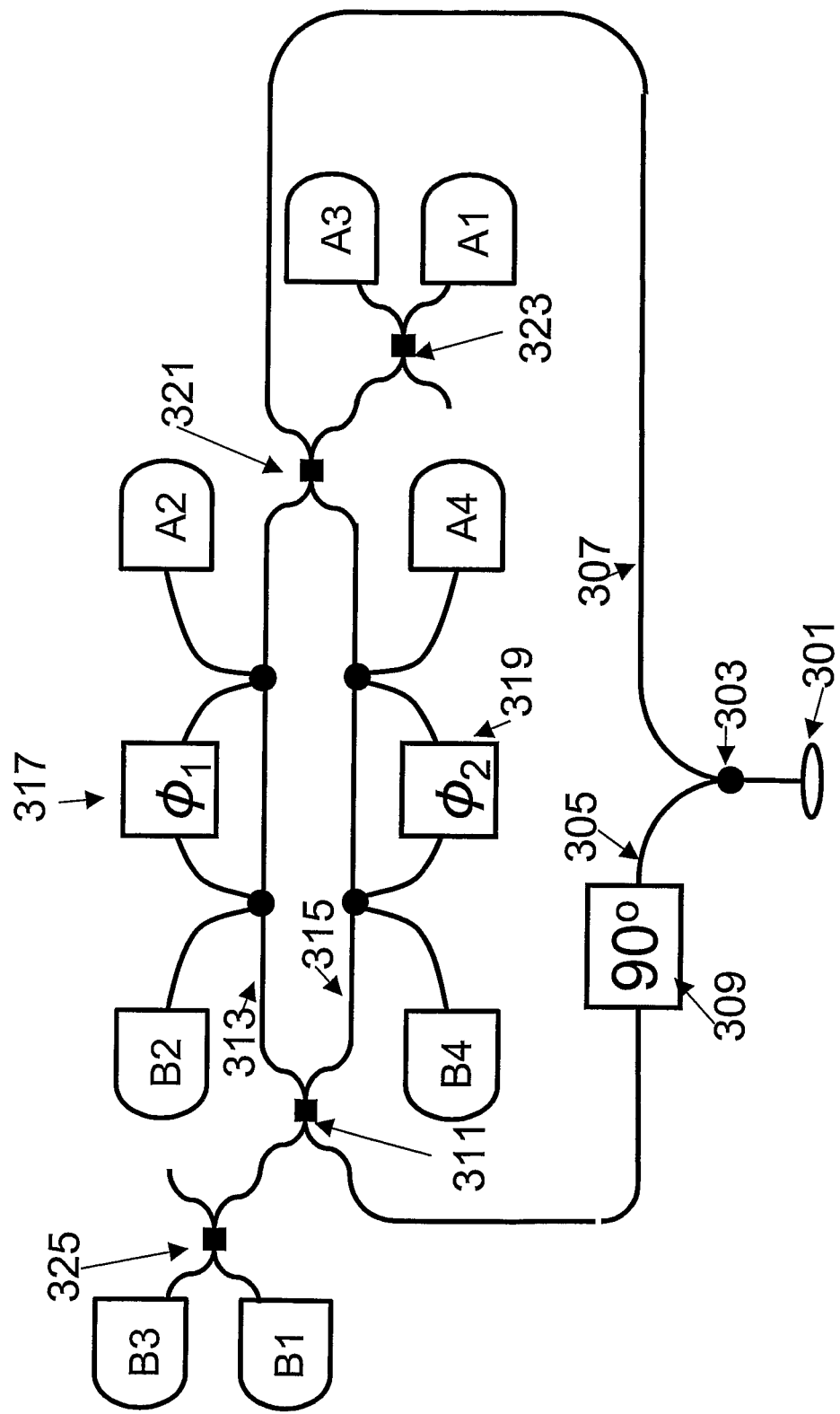
FIG. 7 is a schematic of an interferometer using an unpolarised source and two interferometers in parallel in accordance with an embodiment of the present invention.

In FIG. 7 source 301 produces photons with either a horizontal or vertical polarisation. The photons are then passed through non-polarising beam splitter 303 and are directed along either arm 305 or arm 307. Photons which travel along arm 305 first have their polarisation rotated by 90° by polarisation rotator 309. The photons are then passed through polarising beam splitter 311. Polarising beam splitter 311 transmits photons with a vertical polarisation along arm 313 and reflects those with a horizontal polarisation along arm 315.

The photons transmitted along arm 313 are then passed through upper MZI 317 which is of the type described with reference to FIG. 2, and the photons which are sent along arm 315 are transmitted into lower MZI 319. Therefore, in contrast to the example of FIG. 2, no photons are lost at beam splitter 311.

Similarly, photons which travel along arm 307 encounter second polarising beam splitter 321. Photons with a horizontal polarisation are directed through the upper MZI 317 and photons with a vertical polarisation are transmitted through lower MZI 319.

Vertically polarised photons travelling from left to right in the upper MZI 317 are directed to either detector A1 or A2. Photons that are directed toward detector A1 pass through second polarising beam splitter 321 and the third polarising beam splitter 323. Horizontally polarised photons travelling from right to left through upper MZI 317 are directed to either detector B1 or B2. Photons which are output to detector B1 have to pass through the first polarising beam splitter 311 and fourth polarising beam splitter 325. Horizontally polarised photons travelling from left to right through the lower MZI 319 our output to either to detector A3 or A4. Further, photons which are travelling right to left and which are vertically polarised, pass through the lower MZI 319 and are output at either detector B3 or B4.

If the photons are travelling in different directions through the upper MZI 317, which pairs out of the detectors mentioned above detects photons depends on the difference in phase experienced by the vertically and horizontally polarised photons travelling through upper MZI 317. Further, if the photons travel through the lower MZI 319 which pairs of the detectors mentioned above detects a photon depends on the difference in phase experienced by the vertically and horizontally polarised photons travelling through the lower MZI 319. When the photons take the desired paths, measurement of one photon causes the collapse of the wave function of the other photon in the pair and this determines its exact position and time of detection.

Interference is generally only seen between photons which have the same energy. In most quantum dots, H and V photons emitted from the neutral exciton state have different energies, thus interference should only be observed when the source emits a H photon then a H photon or V photon and then V photon. It is unlikely to be observed when the source emits a H photon followed by a V photon or vice versa. Thus, in most cases, the efficiency of the system of FIG. 7 is just double over that of the system of FIG. 2. However, in some quantum dots that emit near 885 nanometres, the emission from the H and V states is equal in energy so all combinations will interfere and the efficiency of the system of FIG. 7 would be 4 times that of the system of FIG. 2.

Figure 8:
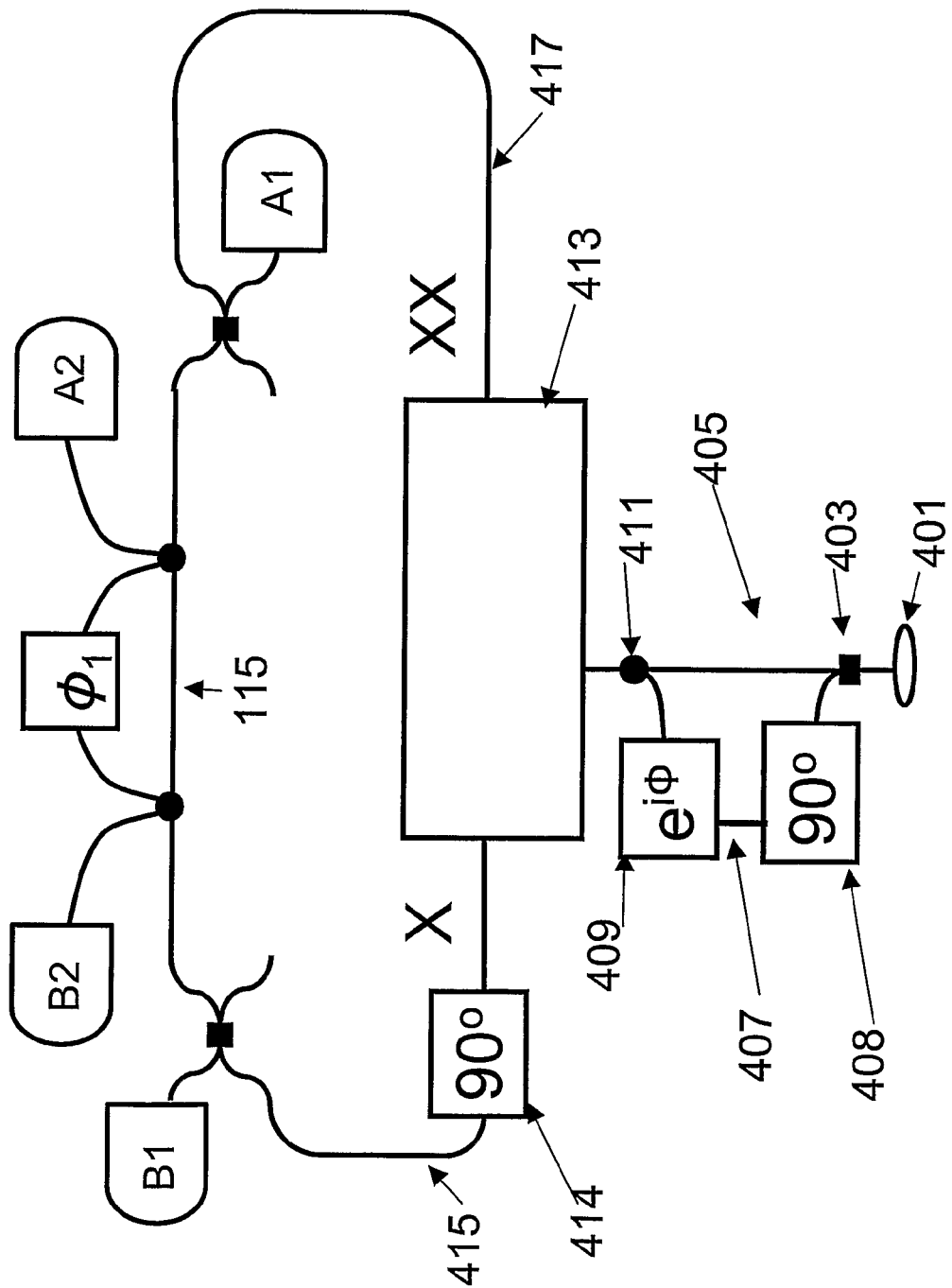
FIG. 8 is a schematic of a system which may be used to analyse an polarisation entangled state in accordance with an embodiment of the present invention.

FIG. 8 is a system comprising an interferometer which may be used for analysing a polarisation entangled state. The system may be used for checking the integrity of an entangled photon source. It also has applications in quantum cryptography which will be discussed later with reference to FIG. 16.

In FIG. 8, the source 401 is the quantum dot type single photon source. Recently it has been shown that quantum dots (R. Stevenson et al, Nature 439, (2006) 179 and R. Young et al, New Journal of Physics, 8 (2006) 29) can emit photons from the cascade biexciton→exciton→empty, which are entangled in polarisation. In order to preserve this entanglement against decoherence from birefringence in the fibre the entangled state may be converted to a phase entangled state. The state outputted by source 401 is:

$$|X_V(0)\rangle|XX_V(0)\rangle + |X_H(0)\rangle|XX_H(0)\rangle \quad (III)$$

where X denotes an exciton photon and XX a biexciton photon. The state then passing to polarising beam splitter 403 which is the start of the source interferometer 405. Source interferometer 405 comprises a long arm 407, the long arm 407 has a phase modulator 409 and a polarisation rotator 408. The interferometer also comprises a short arm 411. The polarising beam splitter 403 is configured to send vertically polarised photons through the long arm 407 and horizontally polarised photons through the short arm 411.

Vertically polarised photons from the source are directed to the long arm 407 by polarising beamsplitter 403 where they are rotated to H polarisation by 408 and are delayed by a time dt. Horizontally polarised photons are directed to short arm 405 by the polarising beamsplitter 403. These two paths are then recombined on coupler 411. Thus, the photon state which was entangled in polarisation has now been entangled into two separate time bins to give:

$$|X_H(dt)\rangle|XX_H(dt)\rangle + |X_H(0)\rangle|XX_H(0)\rangle \quad (IV)$$

This state is robust against fibre birefringence.

The state is then passed to spectrometer 413 which sends photons X arising from the exciton transition down arm 415 and photons XX arising from the biexciton transition down arm 417. The X photons and the XX photons have the same polarisation, so polarisation rotator 414 is provided in arm 415 to change the polarisation of the X photons. The photons are then passed into MZI 115 of the type described with reference to FIG. 2. To avoid any unnecessary repetition, like reference numerals will be used to denote like features.

By choosing an appropriate value of the phase modulator in MZI 115, it is possible to determine which detectors (A1, A2, B1, B2) should fire if the state is fully entangled. This allows the integrity of the source to be analysed.

Figure 9:
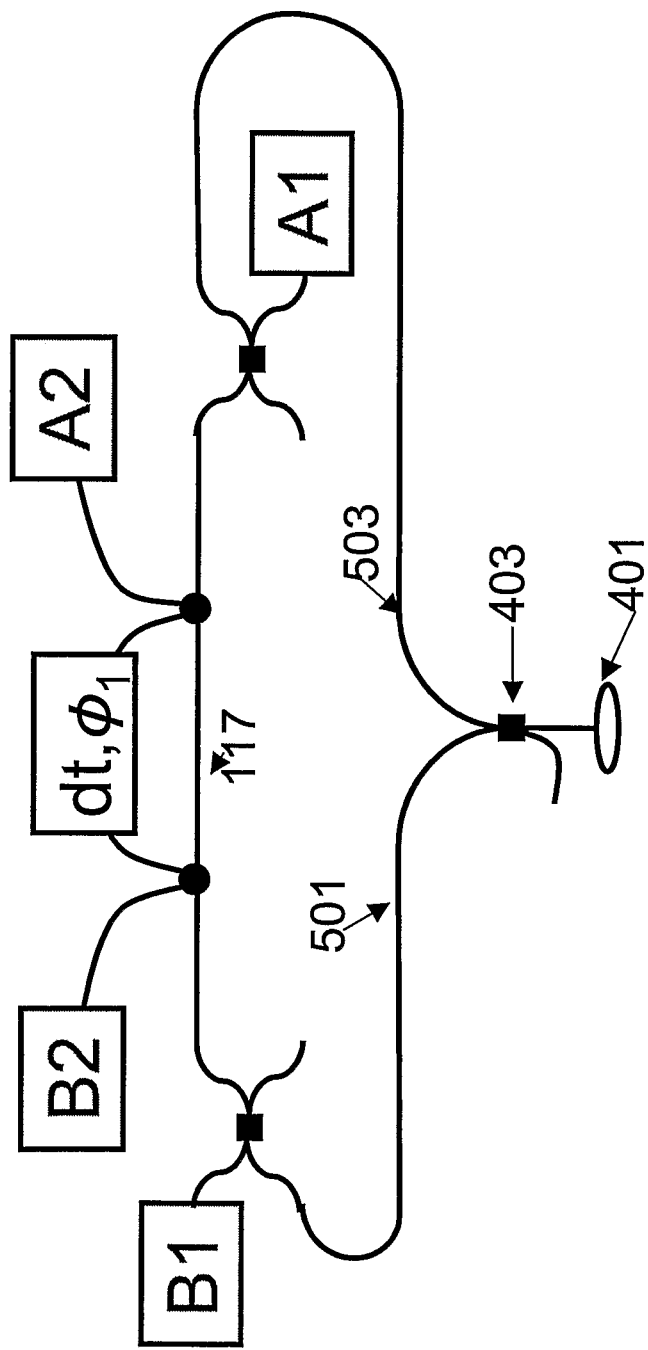
FIG. 9 is a schematic of a multi-photon entanglement system in accordance with an embodiment of the present invention.

FIG. 9 is a schematic of a system which can achieve multi-photon entanglement. In FIG. 9, a source 401 is of the type described with reference to FIG. 8. The source 401 emits photons from a cascade biexciton→exciton→empty which are entangled in polarisation. The output of this source is then passed through polarising beam splitter 403 which directs photons with a vertical polarisation along arm 501 and with a horizontal polarisation along arm 503.

However, in contrast to the system of FIG. 8, instead of single photons being directed down either arm 501 or arm 503, biphotons consisting of one X photon and one XX photon are directed down each arm. The source is configured to emit a biphoton at time zero and a second biphoton at a time dt later.

Since there are now biphotons moving through the system, the single photon detectors previously shown are now replaced with bi-photon detectors A1, A2, B1 and B2. The effective wavelength of a bi-photon is half that of an individual photon. Therefore, rather than correlations between bi-photon detectors varying as $\cos(\Delta\phi)$, they now vary as $\cos(2\Delta\phi)$. Thus:

$$\langle\Psi_{A2:B2}|\Psi_{A2:B2}\rangle \alpha \{1+\gamma^2 \cos(2\Delta\phi)\}$$

$$\langle\Psi_{A2:B1}|\Psi_{A2:B1}\rangle \alpha \{1+\gamma^2 \cos(2\Delta\phi)\}$$

$$\langle\Psi_{A1:B2}|\Psi_{A1:B2}\rangle \alpha \{1+\gamma^2 \cos(2\Delta\phi)\}$$

$$\langle\Psi_{A1:B1}|\Psi_{A1:B1}\rangle \alpha \{1+\gamma^2 \cos(2\Delta\phi)\} \quad (V)$$

The four photons involved (i.e. the two X photons and the two XX photons) are then in a four-photon state which is entangled. Therefore it is possible to distribute the photons between multiple locations for example between four parties in quantum cryptography.

Figure 10:
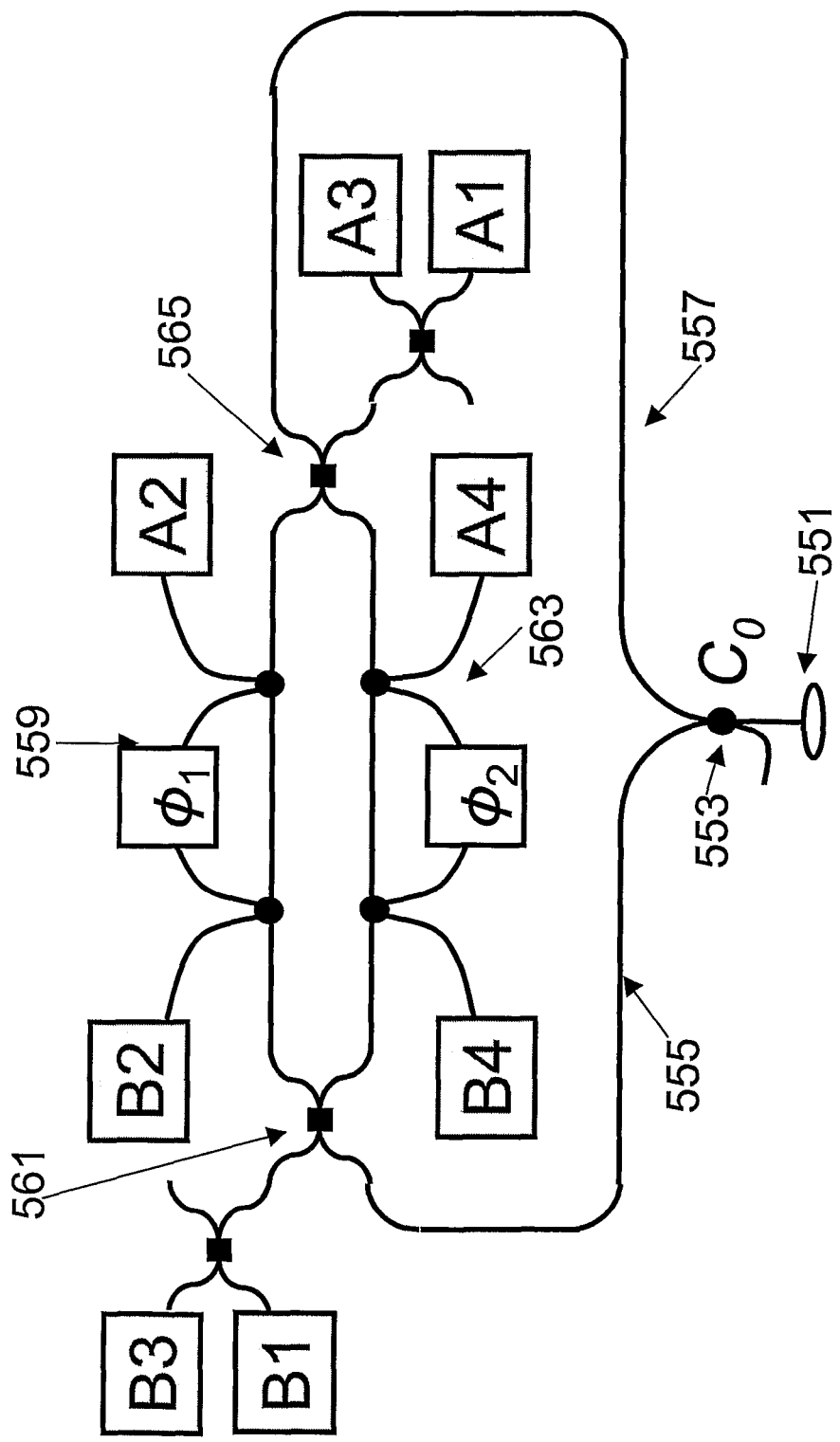
FIG. 10 is a further embodiment of the invention having a multi-photon entanglement system.

FIG. 10 shows a further variation on the system in FIG. 9. In FIG. 10, source 551 generates an input state:

$$X_V(0)\rangle|XX_H(0)\rangle + |X_H(0)\rangle|XX_V(0)\rangle$$

The input state is fed into beam splitter 553 which directs photons randomly down arm 555 or arm 557

One biphoton passes down arm 555, this bi-photon may be either horizontally or vertically polarised. If it is vertically polarised, it is passed into upper MZI 559 via polarising beam splitter 561. If it is horizontally polarised, it is passed into lower MZI 563 via polarising beam splitter 561. Similarly, bi-photons which pass down arm 557 if they are horizontally polarised they will be directed by beam splitter 565 into upper MZI 559 and if they are vertically polarised, they are directed by beam splitter 565 into lower interferometer 563.

Therefore, if a bi-photon is directed down arm 555 with one polarisation e.g. vertically polarised and a second bi-photon is directed down path 557 with the opposite polarisation (e.g. horizontally polarised), then the bi-photons will either both interfere in the upper MZI 559 and be entangled. Similarly, if the photons have the reversed polarisations, they will be entangled by lower MZI 563.

The two bi-photons if separated by a time dt will produce a four photon entangled state. For the above two schemes, two "bi-photons" separated by dt must appear indistinguishable to the biphoton detectors, in other words both the X and XX photons must be time-bandwidth limited. This could be achieved by using a low Q cavity with a mode broad enough to encompass both the X and XX states, with a correspondingly low mode volume so as to obtain a high Purcell factor.

Figure 11:
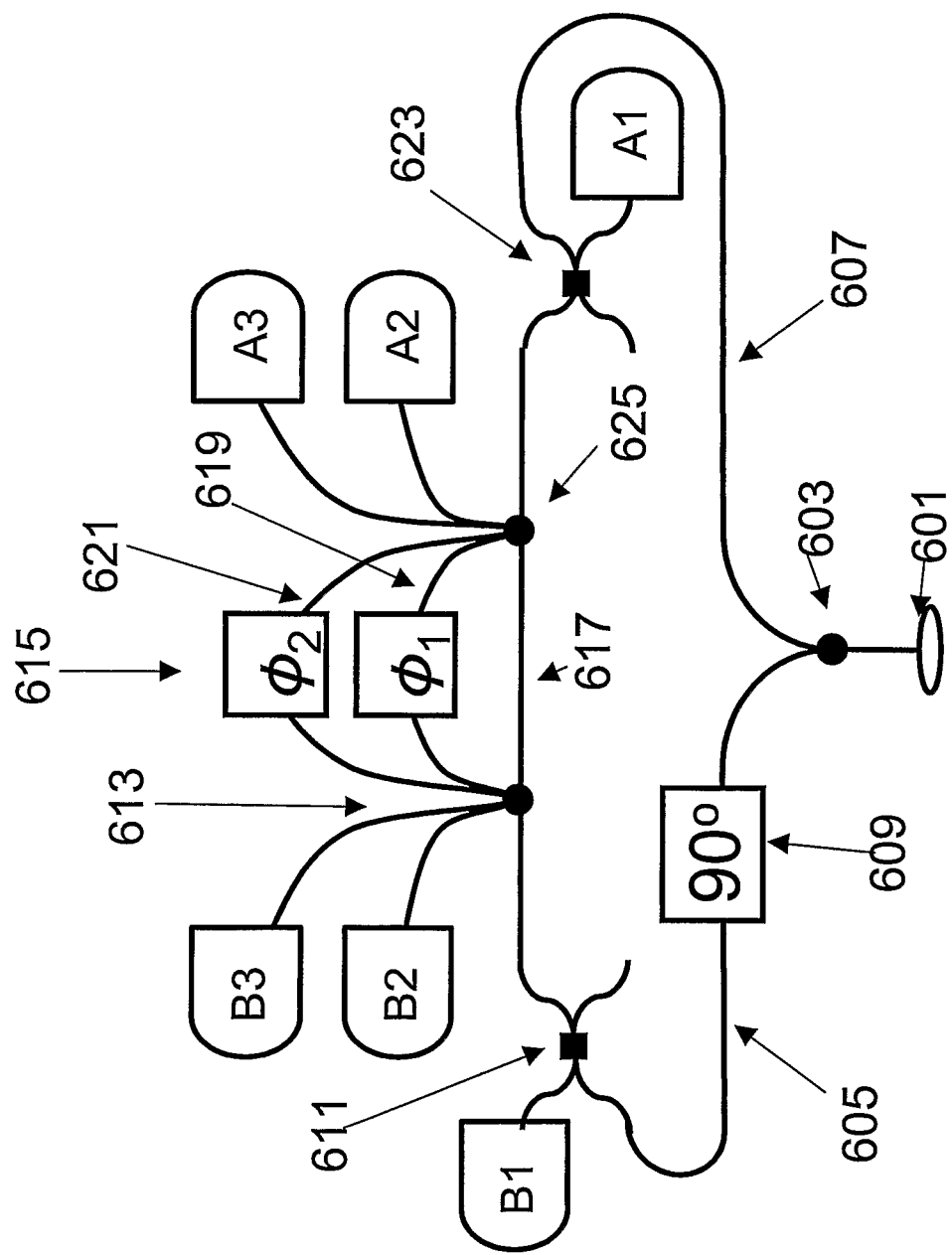
FIG. 11 is an interferometer which is being configured for qutrits in accordance with an embodiment of the present invention.

FIG. 11 is a schematic of an interferometer having three paths. In the interferometer of FIG. 2, the photons can take one of two paths i.e. the long arm or the short arm. In FIG. 11, the photons can take one of three paths through the interferometer.

In the example of FIG. 11, the source 601 is a source of horizontally polarised photons, these are then split via non-polarising beam splitter 603 so that they follow either arm 605 or arm 607. Photons which travel along arm 605 have their polarisation rotated by 90° by polarisation rotor 609. This results in vertically polarised photons. The vertically polarised photons are then passed into polarising beam splitter 611 and then onto non-polarising 33/33/33° beam splitter 613. This type of 3-way beam splitter is known as a fritter.

The photon can then follow one of three paths through the interferometer 615. The three paths are through the short arm 617, the long arm where a phase difference of $\phi_1$ is produced 619 and the medium arm where a phase difference of $\phi_2$ is produced, 621. The fact that the photon can take three paths allows a qutrits to be generated where each particle may occupy three possible states. Such states have been shown to provide increased security in quantum communication applications and stronger non-local correlations in tests of Bell's inequality.

Photons which are directed along arm 607 are horizontally polarised and directed into interferometer 615 via beam splitter 623. These photons then encounter tritter 625 which can direct the photons along one of the three paths 617, 619 and 621. Dependent on the phases set in the phase modulators in arm 619 and 621, photons detection events at A1, A2 and A3 will be correlated with photon detection events at B1, B2 and B3.

Figure 12:
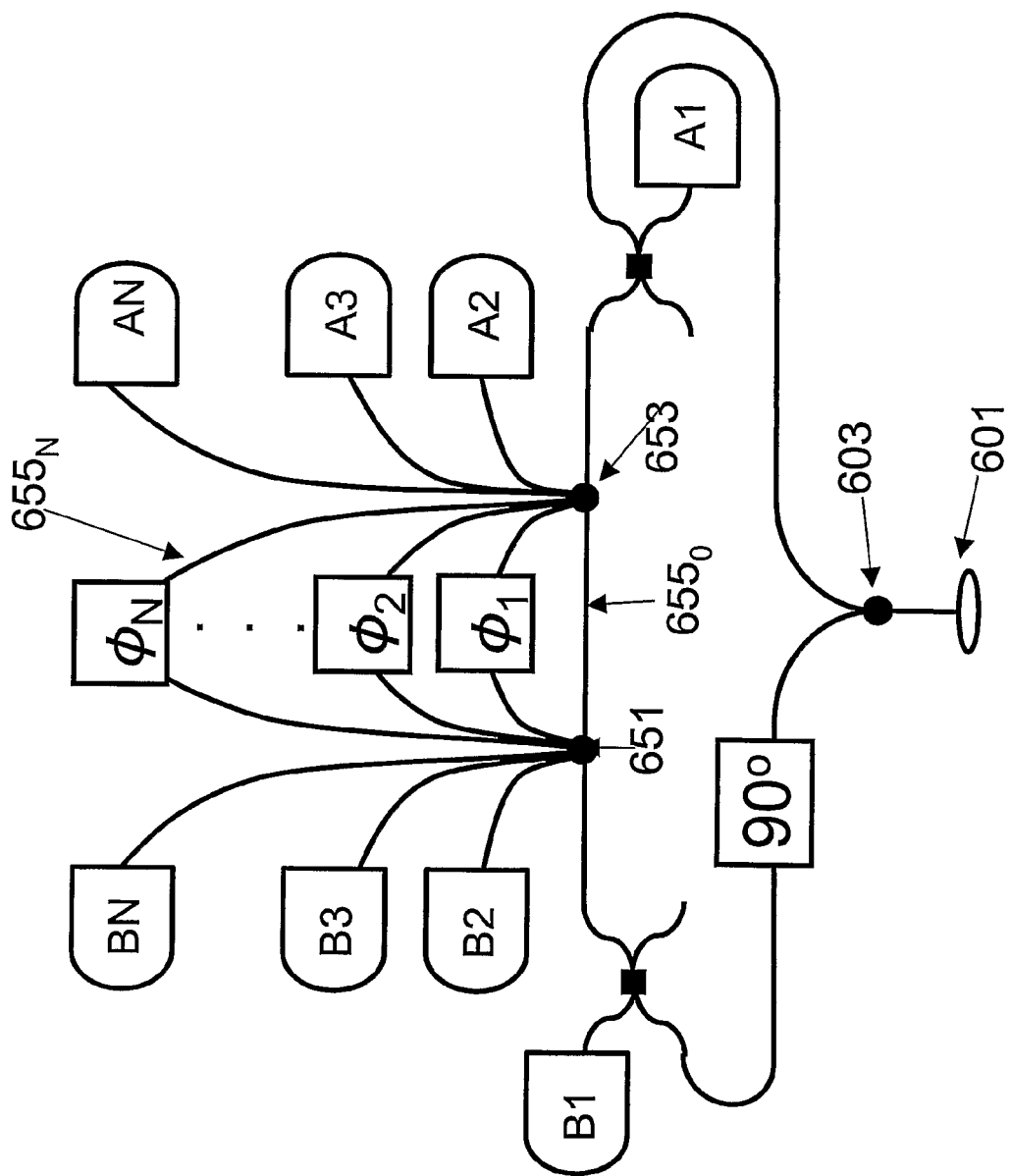
FIG. 12 is an interferometer for quantum quNits in accordance with an embodiment of the present invention; (Note that "multiple quantum bits" means many quBits (i.e superpositions of 1 and 0, whereas this is a "quantum multi-bit" where a single quNit can exist in multiple states).

An extension of the idea of FIG. 11 is shown in FIG. 12 where instead of three paths, the interferometer is extended to N paths so it is an interferometer for quNits.

To avoid unnecessary repetition, like reference numerals will be used to describe the features described with reference to FIG. 11. The tritter 613 and 625 of FIG. 11 are replaced by N-way beam splitters 651 and 653. N-way beam splitter 651 can direct a photon randomly down any of paths $655_0$ $655_1$ which has a phase difference of $\phi_N$ up to path $655_n$ which has a phase difference of $\phi_N$. This allows each particle passing through the system to be placed in an N-path superposition which has further benefits for quantum communication with regards to security as described with reference to FIG. 11.

Figure 13:
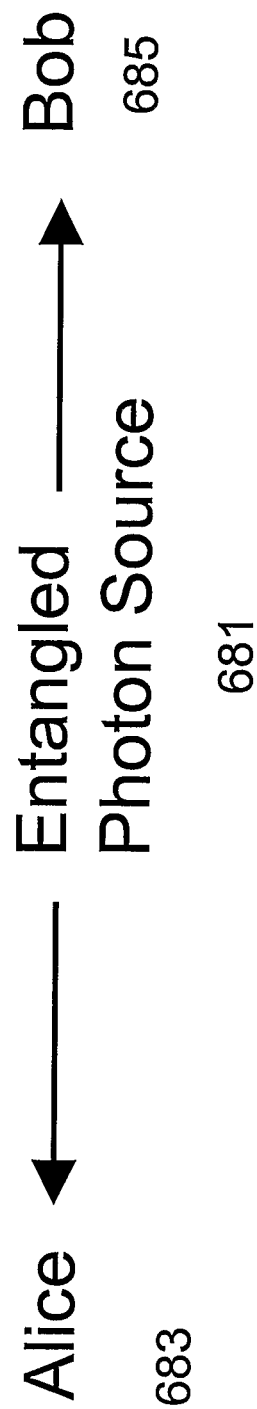
FIG. 13 is a schematic showing the concept of a quantum cryptography system using an entangled photon source.

FIG. 13 shows a schematic of the principle of quantum cryptography using an entangled photon source. The entangled photon source 681 sends one photon of an entangled photon pair to Alice 683 and the other photon of the same entangled pair to Bob 685. When Alice makes a measurement on her photon, the wave function of Bob's photon collapses thus allowing Alice to send information through to Bob 685.

Many protocols exist which are based on entangled photon pairs including the Ekert protocol and a two particle analogue of the BB84 scheme. In the latter case, the source could be used to emit photons entangled to have the same polarisation in any one of two bases which are selected randomly from each pair (say horizontal/vertical and diagonal/anti-diagonal). Alice and Bob can each receive one of these photons and randomly measure it in either basis. After their measurement, the source can publicly announce which basis it used for each photon pair and then Alice and Bob only keep data from the measurements when they are both measured in the same basis as the source.

Figure 14:
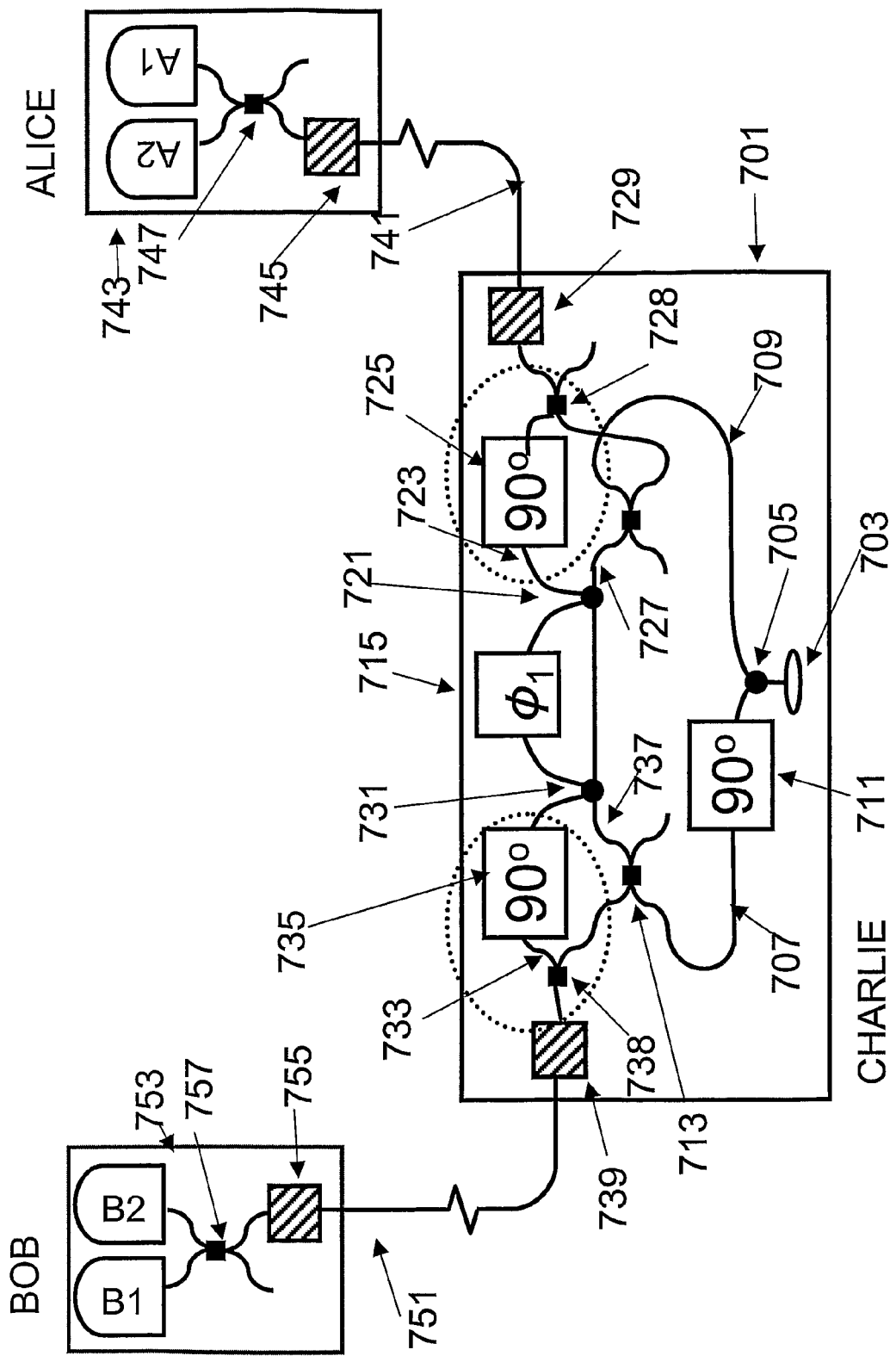
FIG. 14 is a further quantum cryptography system in accordance with an embodiment of the present invention.

FIG. 14. The entangled photon source 701 based is on the interferometer of FIG. 2. A source of photons 703 produces horizontally polarised photons which are then passed through non-polarising beam splitter 705. Beam splitter 705 can direct photons either along arm 707 or arm 709. Photons which are directed along arm 707 of a horizontal polarisation but to change to a vertical polarisation by polarisation rotator 711. The vertically polarised photons are then passed through polarising beam splitter 713 and into interferometer 715 which is identical to the interferometer described with reference to FIG. 2.

Horizontally polarised photons which pass along arm 709 are then directed into beam splitter 717 and then into interferometer 715. Vertically polarised photons traveling through interferometer 715 in the direction from left to right become entangled in position and time with horizontally polarised photons traveling through interferometer 715 from right to left.

The vertically polarised photons traveling through the interferometer from left to right exit the interferometer and pass through non-polarising beam splitter 721 which directs the photons either along arm 723 to polarisation rotator 725 which converts their polarisation to H or along arm 727. These two paths (723 and 727) are then recombined at polarizing beamsplitter 728 and directed along path 741. Thus, the modulation applied by interferometer 715 is converted into a polarisation modulation: both components which took paths 723 and 727 travel along path 741 at the same time but with orthogonal polarizations.

Photons which travel from right to left through interferometer 715 impinge on beam splitter 731 which directs photons either into arm 733 and into polarisation rotator 735 which converts their polarization to V or arm 737. These two paths (733 and 737) are then recombined at polarizing beamsplitter 738 and directed along path 751. In this way polarization entangled photons are generated by the apparatus 701 which can be used within a (prior art) quantum cryptography system as shown in FIG. 13 as explained below.

In order to carry out quantum cryptography Charlie must use the two waveplates 739 and 729 to encode the photons in one of two bases (say horizontal/vertical or diagonal/anti-diagonal) which are selected randomly for each photon emitted. To ease understanding of how this protocol proceeds assume that phase modulator 715 is set to 0 degrees and both waveplates 739 and 729 are moved in unison, randomly for each photon. This arrangement ensures that the two entangled photons traveling down fibres 741 and 751 are of equal polarization in a basis known only to Charlie. Alice's equipment comprises a wave plate 745 which allows her to apply a modulation of either 0° or 45° which acts as Alice's measuring bases. Alice varies the measurement randomly between each photon. The photons are then passed into polarising beam splitter 747 which then directs the photons into either detector A1 or detector A2.

Similarly, photons which have passed through interferometer 715 from right to left are then directed down cable 751 to Bob 753. Bob also has a wave plate 755 which he uses to change the polarisation between 0° bases and 45° randomly between each photon. The photons are then passed into beam splitter 757 which will then direct photons either into detector B1 or detector B2. After Alice and Bob have made their measurements Charlie publicly announces which basis he used to encode each photon.

Alice or Bob making a measurement in their system in a basis as defined by their wave plates 745 and 755 will cause the wave function of the photons in the other receiver to collapse and thus there is correlation between Alice and Bob's results if they use the same basis. Alice and Bob then only keep the data from when they used compatible bases.

In the above explanation, the phase modulator 715 is set to 0° and both waveplates 739 and 729 are moved in unison (i.e correlated), but randomly set for each photon. Thus the fact that the photons are correlated in polarisation (but not the settings of the waveplates for each photon) could be publicly announced by Charlie prior to the distribution of the entangled photons and the protocol would then proceed as specified in prior art (e.g. Quantum Cryptography, N. Gisin et al, Review in Modern Physics, Vol 74 (2002) page 153). This arrangement ensures that the two entangled photons traveling down fibres 741 and 751 are of equal polarization in a basis known only to Charlie.

However, whether Alice and Bob's photons are correlated or anti-correlated will depend on both the phase modulation applied by phase modulator 715 and what the waveplates 739 and 729 were set to: for example if the phase modulator 715 was set to π and the waveplates still moved in unison then the photon detection events by Alice and Bob would be anticorrelated: such that if Alice measures a H photon at her apparatus Bob will receive a vertically polarized photon etc. Thus, if the phase modulator 715 and the whether the waveplates 739 and 729 were correlated or anticorrelated was varied during distribution of each quantum key then information about whether each photon pair should be correlated or anti-correlated would also need to be publicly announced by Charlie in order for Alice and Bob to successfully decode the key.

Figure 15:
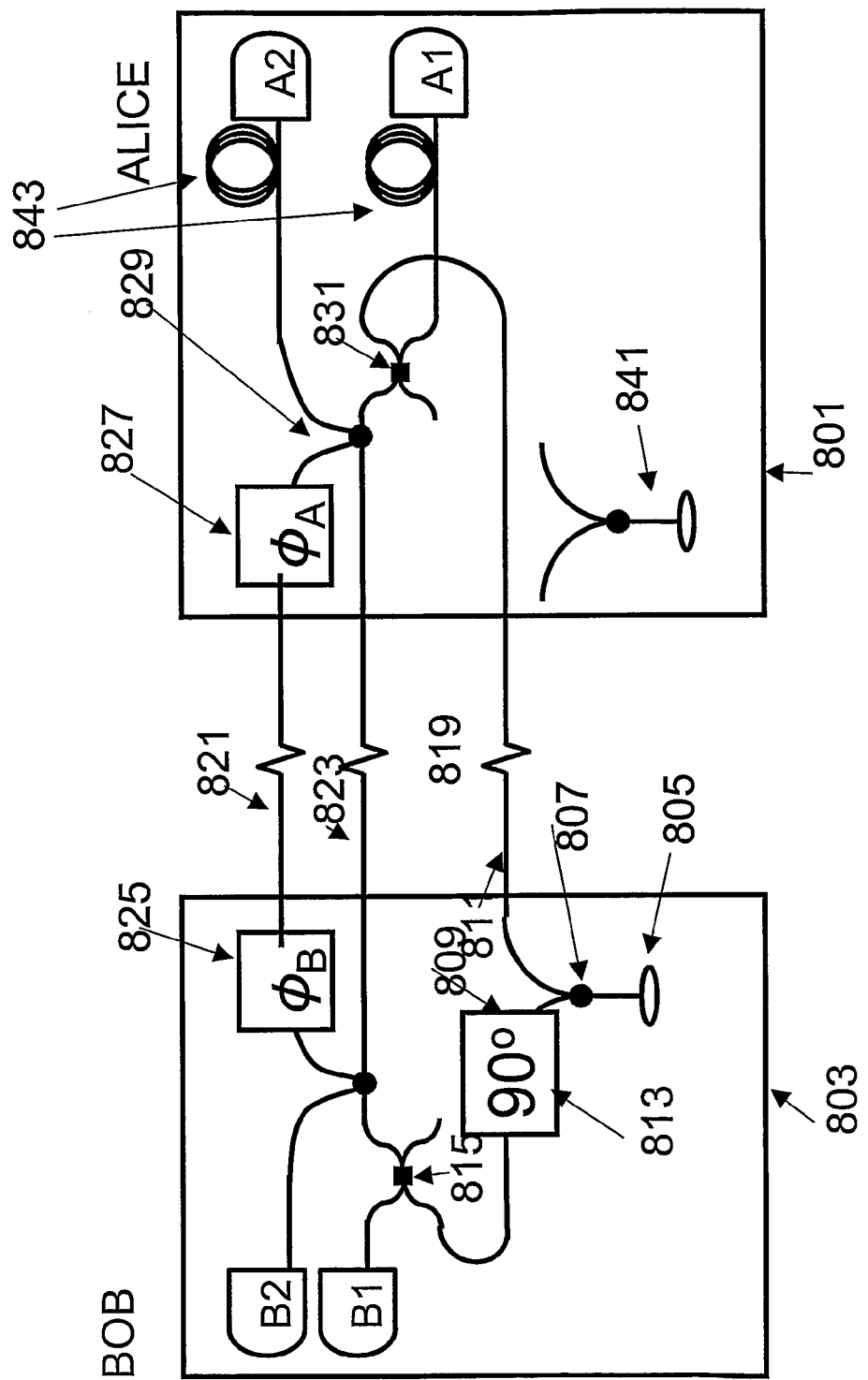
FIG. 15 is a yet further quantum cryptography system in accordance with an embodiment of the present invention.

FIG. 15 shows a further variation on a quantum cryptography system in accordance with an embodiment of the present invention.

In FIG. 15, Bob 803 communicates a key to Alice 801. The apparatus that Alice and Bob have is basically the interferometer described with reference to FIG. 2 which is stretched between Alice and Bob. In this particular embodiment, Bob has a source 805 which may produce horizontally polarised photons. Beam splitter 807 directs photons either down arm 809 or arm 811. Horizontally polarised photons which are directed down arm 809 pass through polarisation rotator 813 which converts the polarisation of the photons to vertically polarised. The vertically polarised photons then pass through polarising beam splitter 815 which then directs vertically polarised photons to non-polarising beam splitter 817 which is the start of interferometer 819. Interferometer 819 is split between Alice and Bob. Interferometer 819 comprises a long arm 821 and a short arm 823. In long arm 821 there is a first phase modulator 825 which is controlled by Bob 803. In this particular example, both the long arm and the short arm 823 extend from Bob to Alice 801. A second phase modulator 827 is also provided in the long arm but this second phase modulator is under Alice's control. The long arm 821 and the short arm 823 are then combined at non-polarising beam splitter 829 at Alice's side.

The photons are then directed either into Alice's detector A1 or Alice's detector A2 dependent on the phase modulation applied by both Alice using her phase modulator 827 and Bob using his phase modulator 825. Horizontally polarised photons which pass down arm 811 are communicated directly to Alice and pass into polarising beam splitter 831 and then into interferometer 819 which is stretched between both Alice 801 and Bob 803. The photons which travel from Alice to Bob then impinge on non-polarising beam splitter 817 and into either detector B1 or B2 of Bob's dependent on the phase modulation applied by both Alice and Bob.

Consider an example where Alice and Bob randomly vary their phase modulators between 0 and pi for each photon pair which passes through the apparatus, but they keep their phase modulator setting secret. After all the photons have been measured Alice can publicly announce what setting she used for each photon. Bob will then know the total phase introduced by phase modulators 925 and 927 (0, π or 2π) and consequently will know whether each photon pair should be correlated (total phase=0 or 2π) or anticorrelated (total phase=π). Bob also knows where each photon was detected (B1 or B2) so for every entangled pair he can determine where Alice detected her photon (A1 or A2). This information forms a secret key. Alice can use her secret knowledge of where her photon was detected to encode a message.

In this apparatus the source 805 emits indistinguishable pairs of photons separated in time by the delay in the interferometer. Alice may also have a removable source 841. It is important for Alice and Bob to make their measurements at the same time. Therefore, Bob should not measure his photons before Alice measures hers. In this example, Alice can save her photons in a quantum memory 843 which are provided by optical fibre loops before detectors A1 and A2.

Figure 16:
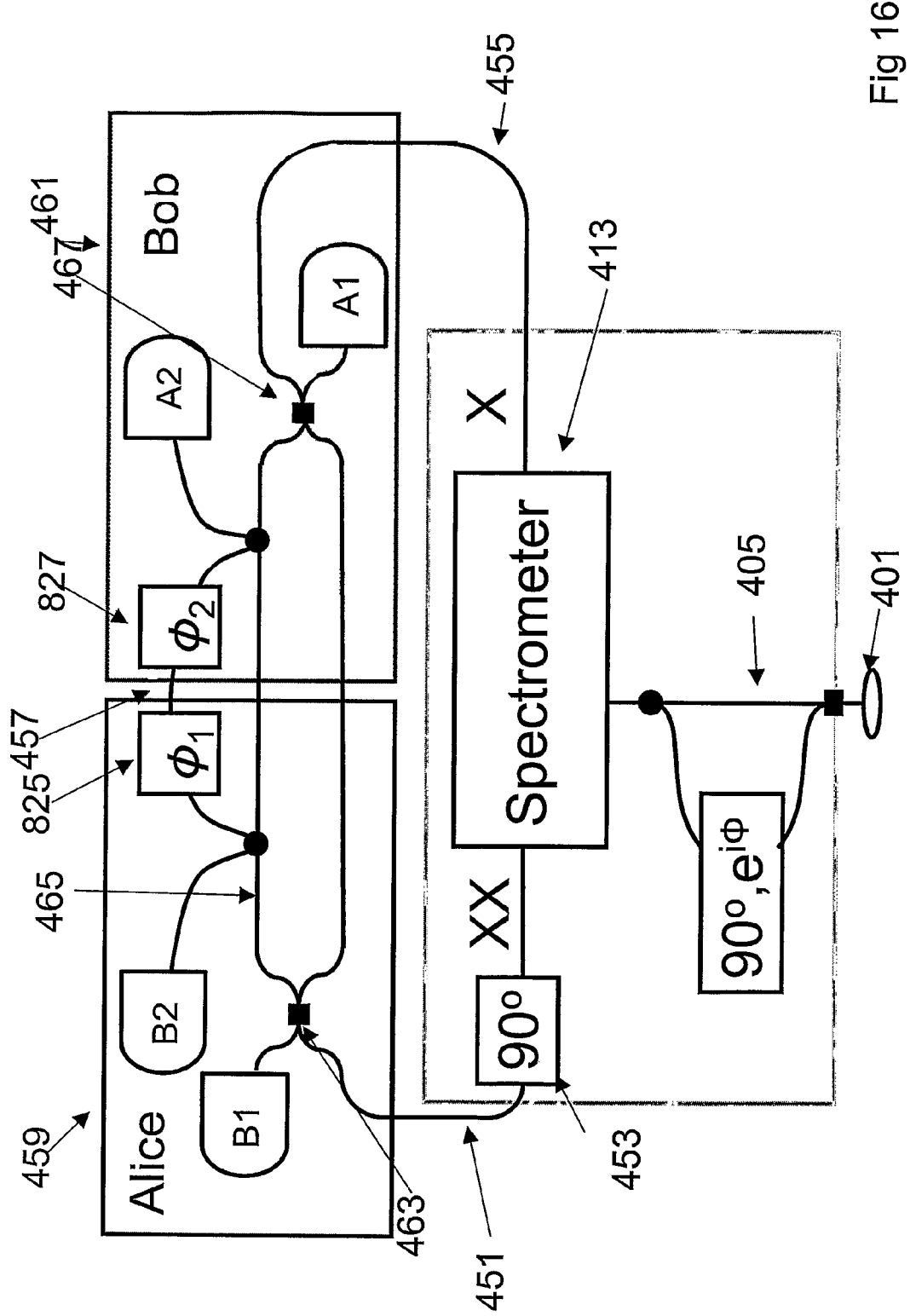
FIG. 16 is a yet further quantum cryptography system in accordance with an embodiment of the present invention.

FIG. 16 shows cryptography system based on FIGS. 8 and 15. To avoid any unnecessary repetition, like reference numerals will be used to demote like features. As described with reference to FIG. 8, the source 401 emits a pair of polarisation entangled photons from the biexciton→exciton→empty cascade. The source interferometer 405 and spectrometer 413 convert these photons into a photon pair which both have H polarisation and are entangled in time-bins. The spectrometer 413 ensures that one photon (the biexciton) travels leftward along arm 451 where its polarisation is rotated by polarisation rotator 453 to vertical and the other photon (the exciton) travels rightward down arm 455. These two photons are then fed into the interferometer 457 which is shared by Alice 459 and Bob 461 in a manner similar to FIG. 15.

The photon travelling along arm 451 is directed to Alice 459. This photon is first transmitted through Alice's polarising beam splitter 463 which directs the photon along arm 465. The photon then enters interferometer 457. The interferometer is of the type described with reference to FIG. 15 and like reference numerals are used to describe like features.

The photon travelling along arm 455 is directed towards Bob and is reflected by polarising beam splitter 467 along arm 465. The photon then enters interferometer 457.

Figure 17:
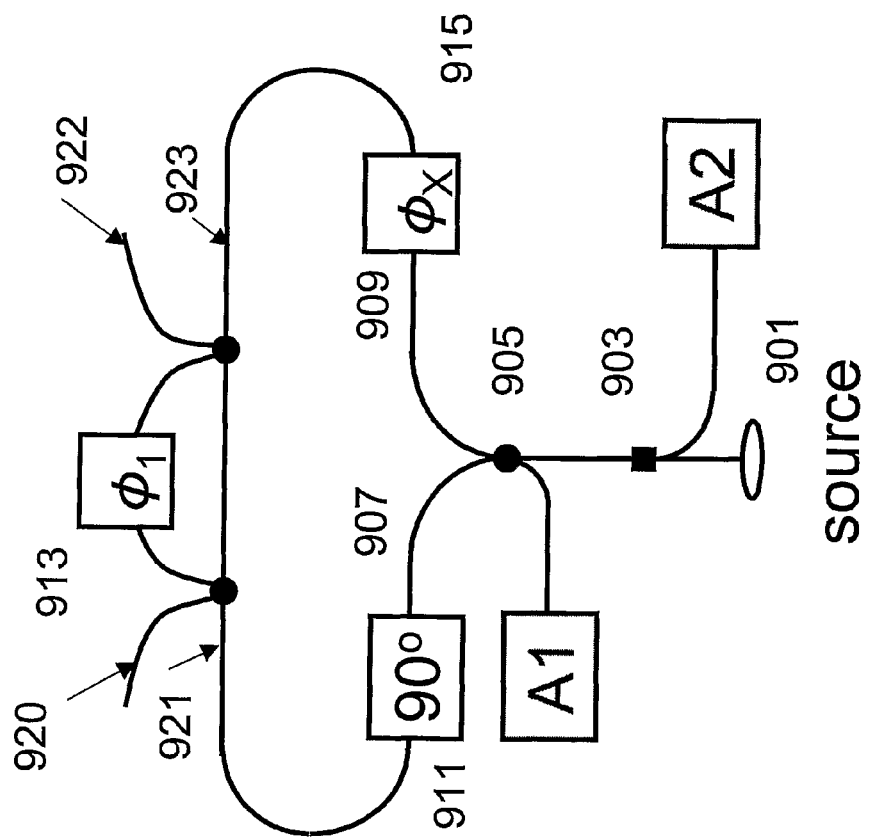
FIG. 17 is a quantum interferometer in accordance with an embodiment of the present invention.

Consider an example where Alice 459 and Bob 461 randomly vary their phase modulators 825 and 827 between 0 and π for each photon pair which passes through the apparatus, but they keep their phase modulator 825, 827 setting secret. After all the photons have been measured Alice can publicly announce what setting she used for each photon. Bob will then know the total phase introduced by phase modulators 825 and 827 (0, π, or 2π) and consequently will know whether each photon pair should be correlated (total phase=0 or 2π) or anticorrelated (total phase=π). Bob also knows where each photons was detected (B1 or B2) so for every entangled pair he can determine where Alice detected her photon (A1 or A2). This information forms a secret key. Alice can use her secret knowledge of where her photon was detected to encode a message FIG. 17 is a schematic of an embodiment of the present invention which can be used for quantum interferometry or quantum imaging. The arrangement of the interferometer is similar to that described with reference to FIG. 2. The photon pairs are generated by source 901 and pass through polarising beam splitter 903 which passes photons in this particular example with a horizontal polarisation. The horizontally polarised pairs of photons are then passed into non-polarising beam splitter 905 which directs photons randomly down arm 907 or arm 909. The system can be used as an interferometer or for imaging when either a pair of photons is passed down arm 907 or a pair of photons is passed down arm 909.

Interferometer 913 has a fixed phase shift $\phi_1$ which is set to (2n+1)pi (where n is an integer) provided in one of its arms. This is the important bit, as by choosing this setting for 913 it is ensures that two photons which took opposite paths when entering the interferometer at 905 will not both be directed back to 905. If one leftward travelling photon is detected in path 920 then the rightward traveling photon must be in arm 923, and if one leftward travelling photon is detected in path 921 then the rightward traveling photon must be in arm 922. Thus the only way the two bi-photon detectors can detect a biphoton is if two photons which were initially fed into the interferometer leave the non-polarising beamsplitter 903 in the same direction. From now on it will be easier to discuss this embodiment with reference to these bi-photons.

The biphotons can follow one of two paths. If it follows path 907, its polarisation is rotated by 911 so that it is vertically polarised. The vertically polarised biphotons is then directed into the interferometer. In this particular example, we will assume that φx only operates on biphotons which are horizontally polarised. The vertically polarised biphotons therefore pass through phase modulator 915 unchanged and impinge on beam splitter 905.

The other biphoton state, is horizontally polarised entering beam splitter 905 and are directed down path 909. The biphoton which is directed down path 909 pass through variable phase modulator φx 915. The variable phase modulator modulates the biphoton with a horizontal polarisation and therefore the phase of this biphoton is modulated. The photons then pass through interferometer 913 travelling from right to left. The biphoton will then pass out of the interferometer 913 and into polarisation rotator 911 which converts the horizontally polarised biphoton to vertically polarised biphoton that impinge on beam splitter 905.

Depending on the phase change applied by modulator 915, these two components of the biphoton will interfere when they reach beamsplitter 905. They will then be directed either to biphoton detector A1 or A2 depending on the birefringent element 915.

Any change in the phase experienced by the biphoton will result in a variation in detection at rate A1 that varies with half the single photon wavelength. Thus, this system has double the resolution of a interferometer operating using single photons.

Interferometry systems working on biphoton states have been proposed by (Edamatsu et al Phys. Rev. Left 89 pages 213601-1 to 213601-4 (2002). However, the system of FIG. 15 is particularly advantageous in that the biphotons travel through the same path (albeit via different directions) and this means that the two parts of the biphoton state are automatically incident on central beam splitter 905 at the same time about a need variable delay lines or active stabilisation of the type proposed by Edamatsu.

As described above, the system of FIG. 17 can be used for quantum imaging. It can be used for quantum imaging by placing the object which is to be imaged as polarisation dependent phase shift element φx.

φx could be a liquid crystal which where the phase modulation properties the liquid crystal varies the function of the voltage. It could be some arrangement of birefringement crystals, for example quartz). It could be a fibre optic component.

Figure 18:
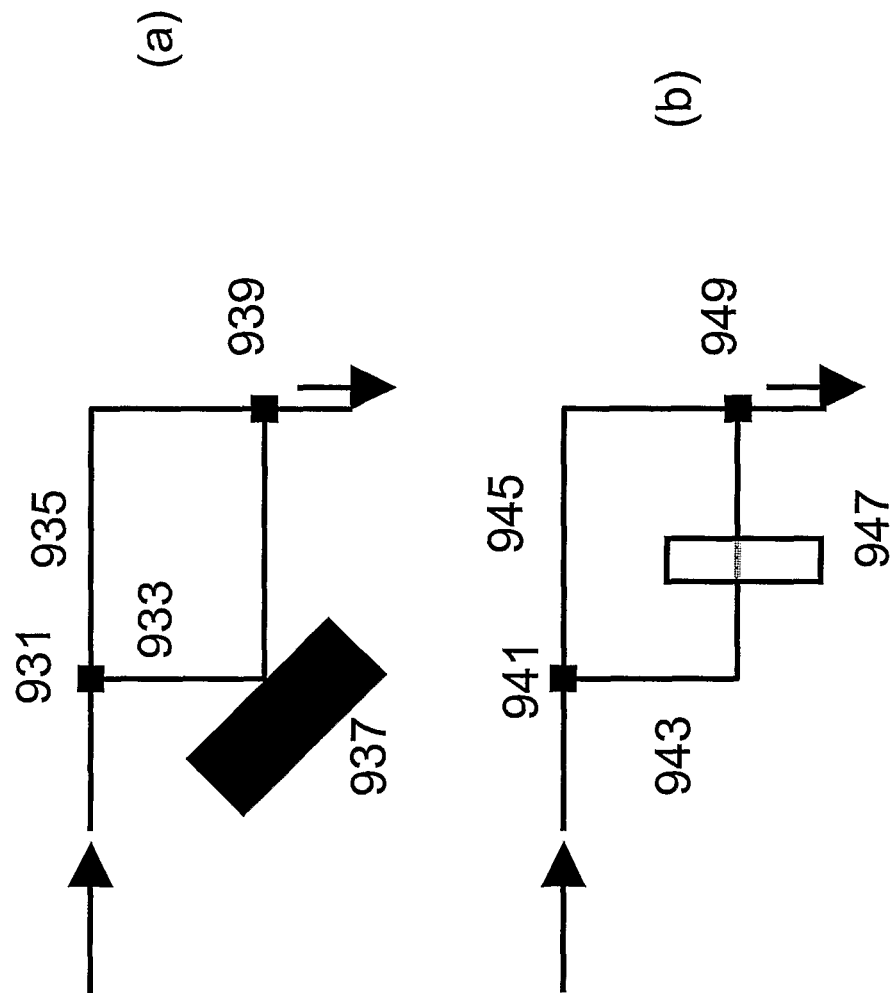
FIG. 18a is a schematic illustrating how the interferometer may be used to study an object in reflection mode to map the surface height and FIG. 18b is a schematic illustrating how the interferometer may be used to study a transparent object in transmission mode to map the thickness.

It would be useful for imaging for the phase shift element to represent sample height. A possible implementation of this is shown in FIG. 18a which could replace the birefringent phase modulator 915 in FIG. 17. In FIG. 18a, a polarising beam splitter 931 which directs photons either along path 933 or path 935. Following the polarisation requirements of FIG. 17, beam splitter 931 directs photons with a horizontal polarisation along path 933 and onto sample 937 which is placed on an xy stage. The photons are then reflected to second beam splitter 939 which combines path 933 and 935. Thus those photons which take path 933 experience a variable phase shift determined by the sample height 917.

It would be useful for imaging for the phase shift element to represent sample thickness. In FIG. 18b, again, a beam splitter 941 is provided which is polarising beam splitter and directs photons with a horizontal polarisation along arm 943 and those of the vertical polarisation along arm 945. Photons which are passed along arm 943 pass through sample 947 which is again located on a xy stage. The transmission of the photons through sample 947 will cause a variation in their phase. Path 943 and 945 are recombined at polarising beam splitter 949 which acts as a combiner. Thus, using either the arrangement of FIG. 18a or 18b, it is possible to investigate a sample using the arrangement of FIG. 17.

Figure 19:
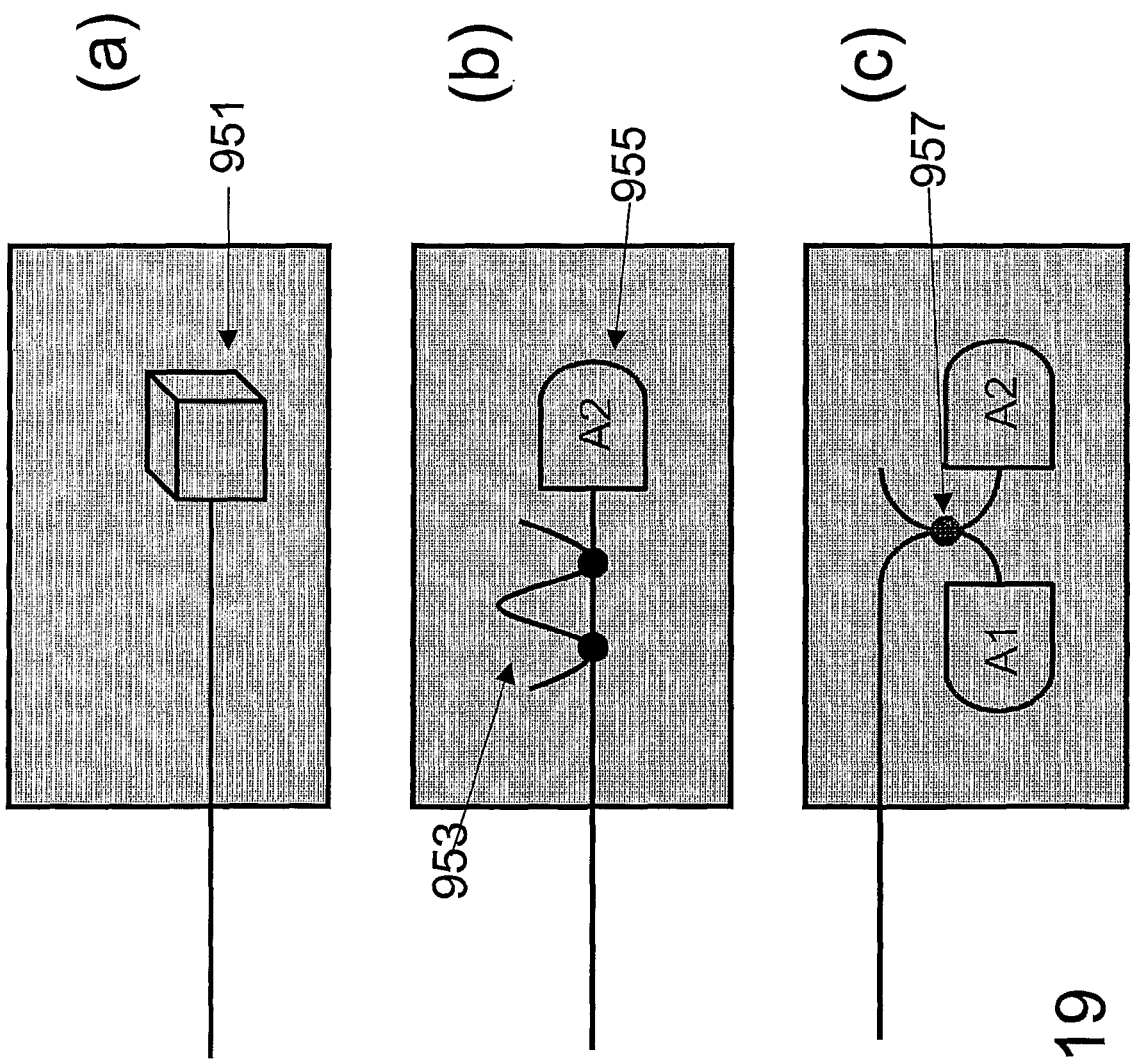
FIG. 19a is a schematic of a multiphoton detector.
FIG. 19b is a schematic of an unbalanced interferometer and a single photon detector, this combination can be used to determine if two photons have been received
FIG. 19c is a 50/50 beam splitter in combination with two single photon detectors.

The apparatus of FIGS. 9, 10 and 17 needs to be able to determine two photon events from single photon events. Therefore, detectors are required which can distinguish between a single photon event and a two photon event. FIG. 19 shows some possible detectors. In FIG. 19a, a photon number resolving detector, for example, a superconducting calorimeter 951 is used. Another possible example of a two photon detector is shown in FIG. 19b where an interferometer which is unbalanced i.e. one arm is longer than the other is provided before a single photon detector A2 955. If two photons are detected separated in time by the time delay in the interferometer 953, a two photon state must have been detected.

Finally, a further example of a two photon detector is provided by a non-polarising splitter 957 which directs its output equally to either detector A1 or A2. If the two detectors fire simultaneously, it is clear that a two photon state was selected. Variations and combinations of these ideas can also be envisaged. The above just represent possible examples of two photon detectors.

Figure 20:
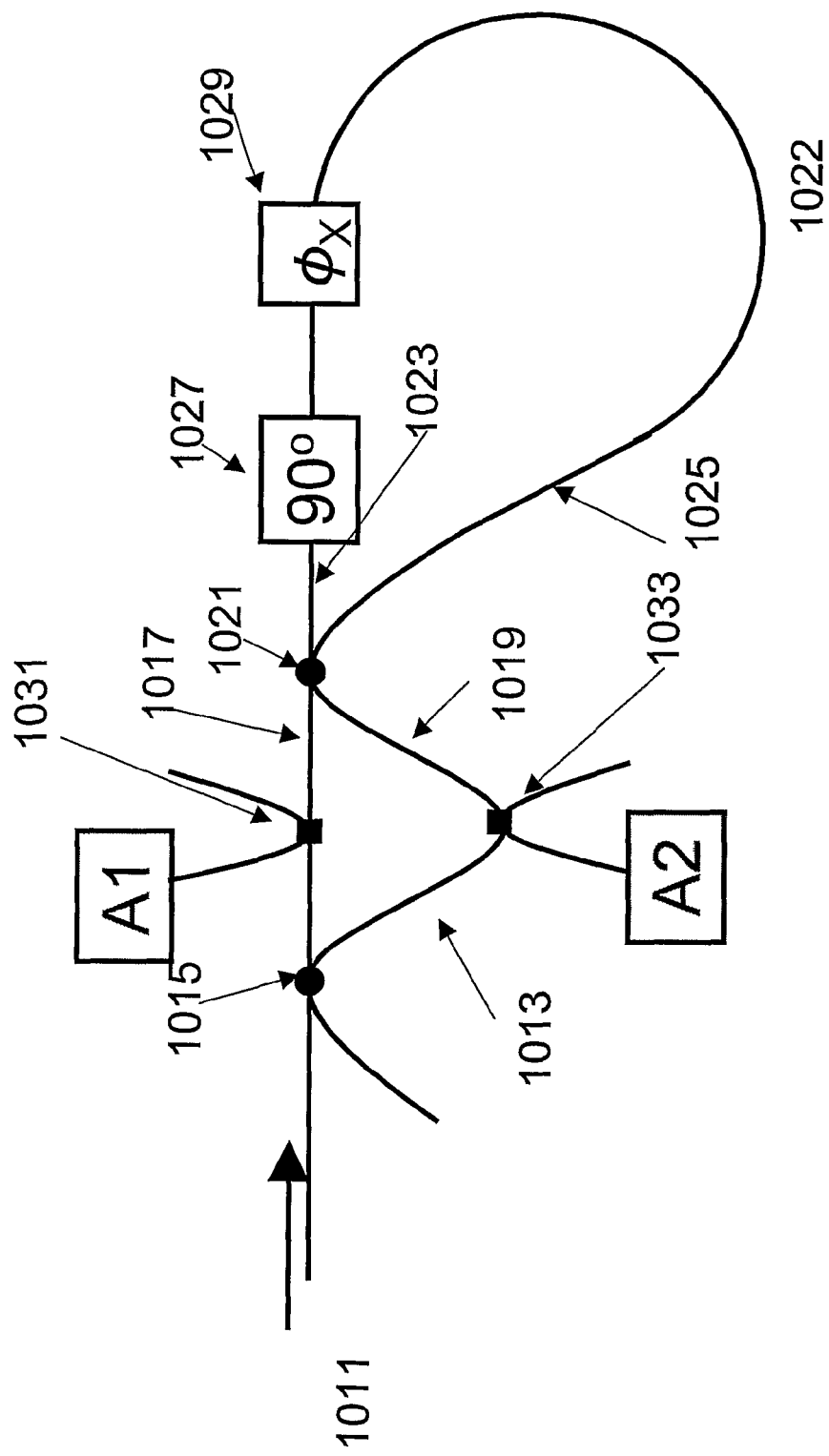
FIG. 20 is a quantum interferometer in accordance with a further embodiment of the present invention.

FIG. 20 is a further variation on the quantum imaging/ interferometer of FIG. 17. In FIG. 20, a horizontally polarised source 1011 is employed which emits indistinguishable photons. The horizontally polarised source 1011 outputs photons separated by a time dt into unbalanced MZI 1013.

Mach-Zehnder interferometer 1013 has a 50/50 beam splitter 1015 which directs photons either down short arm 1017 or a long arm 1019. Short arm 1017 and long arm 1019 have a path difference which is equivalent to a time delay dt i.e. the separation between photons leaving the source 1011. Thus, if the first photon takes the long arm 1019 and the second photon the short arm 1017 they will impinge on the beamsplitter 1021 at the same time and two photon interference will occur. This means that beam splitter 1021 either directs a biphoton (both photons) down arm 1023 or a biphoton down aim 1025. This forms a superposition where one state is represented by photons which are horizontally polarised following arm 1025, then passing through variable phase modulator 1029 which is configured to only operate on photons of a specific polarisation, for example horizontally polarised photons. The biphoton is then passed through polarisation rotator 1027 to convert the biphoton to vertical polarisation.

The second component of the biphoton state passes down arm 1023 which rotates its polarisation to vertical using polarising rotator 1027. The vertically polarised photons are then passed into variable phase modulator 1029 which does not modulate the phase of vertically polarised photons. And these photons then continue around the loop. Both clockwise and anticlockwise components of the biphoton are then incident on the non-polarising beamsplitter 1021 simultaneously, and have the same vertical polarisation.

Depending on the phase applied by birefringent phase modulator 1029, the biphoton will either be directed along short arm 1017 of the interferometer 1013 or the long arm 1019 of the interferometer 1019. Biphotons which are directed along the short arm 1017 have a vertical polarisation and directed by polarising beam splitter 1031 into biphoton detector A1. Biphotons which are directed down arm 1019 also vertical polarisation and are directed by beam splitter 1033 into biphoton detector A2.

The apparatus of FIG. 20 operates in the same manner as the apparatus of FIG. 17. Any change in the phase experienced by the biphoton, will result in a variation in detection at rate A1 but varies with half the single photon wavelength. Thus, this system has double the resolution of a interferometer operating using single photons.

Fibre optic gyroscopes are of great importance in aviation and aerospace applications due to their lack of moving components, high accuracy and small size. The gyroscopes which follow are based upon our previous FIG. 2 to double the accuracy with which rotational motion can be measured.

Figure 21:
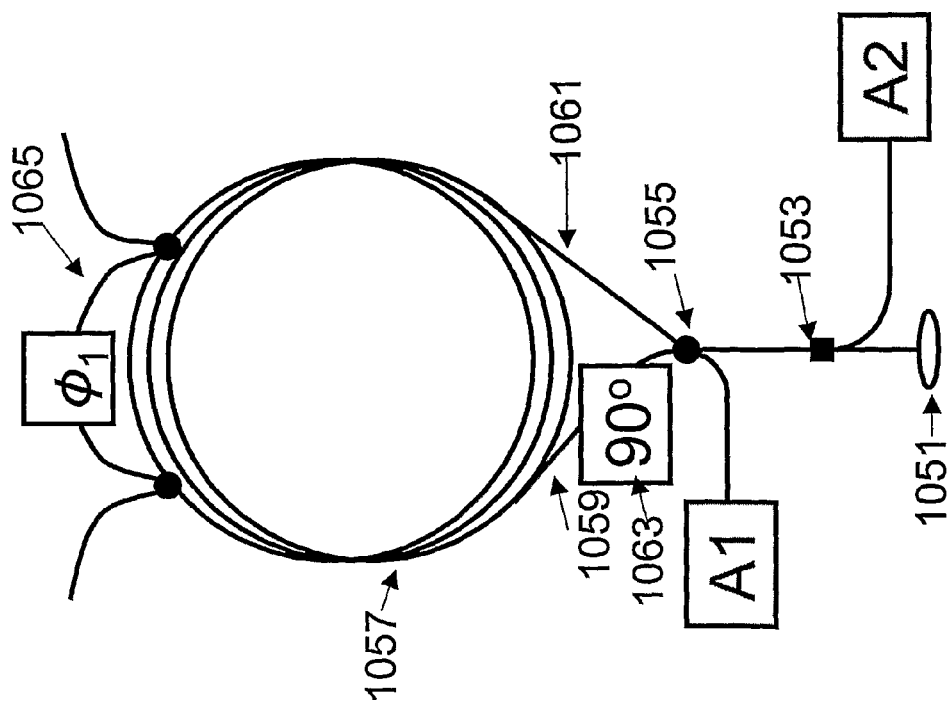
FIG. 21 is a two photon sagnac gyroscope in accordance with a further embodiment of the present invention.

FIG. 21 is a gyroscope in accordance with an embodiment of the present invention. This is a close analogue of the system in FIG. 17 and the same description applies. In FIG. 17 a birefringent phase modulator 915 introduces a phase shift between the biphoton which is incident on beamsplitter 905 from the left relative to the biphoton incident from the right. Instead, in FIG. 21 the rotational velocity of the fibre loops 1057 introduces a phase shift between the clockwise and anticlockwise travelling components of the biphoton.

In a classical sagnac interferometer, a beam of light is split and directed in two different directions around the same ring or path which encloses an area. On return to the point of entry, the light is allowed to exit the interferometer and an interference pattern is obtained. If the interferometer is placed on a rotating platform, the lines of the interference pattern are displaced sideways as compared to the position of the interference pattern which the platform is not rotating. This is because when the platform is rotating, the point of entry/exit moves during the transit time of light. This means that one beam has covered less distance than the beam travelling the other way around the interferometer. This is variation in the path caused by the movement recreates a shift in the interference pattern. Therefore, the interference pattern obtained at each angular velocity of the platform features a different phase shift particular to that angular velocity.

In FIG. 21, photons are produced by source 1051, the photons then pass through polarising beam splitter 1053 which, in this particular example is configured to pass photons having a horizontal polarisation. The photons then pass onto beam splitter 1055 which is the entrance point for sagnac interferometer 1057. Sagnac interferometer comprises N-loops having a radius R. The addition of N-loops of fibre in the system increases the sensitivity of the gyroscope by increasing the length of the fibre loop without taking up a large amount of space.

The photons can occupy a first state where they pass along path 1059. In the first state, the photons have their polarisation rotated by 90° by rotator 1063 on entry into the system. In the second state, photons pass along path 1061. In both states, they enter interferometer 1065. Interferometer 1065 is an unbalanced interferometer with a delay time of dt between the two arms of the interferometer 1065. The delay time dt corresponds to the time separation between the photons emitted from source 1051. Interferometer 1065 has a fixed phase shift $\phi_1$ which is set to (2n+1)pi (where n is an integer) provided in one of its arms. This is the important bit, as by choosing this setting for 1065 it is ensures that two photons which took opposite paths when entering the interferometer at 1055 will not both be directed back to 1055. Thus the only way the two bi-photon detectors can detect a biphoton is if two photons which were initially fed into the interferometer leave the non-polarising beamsplitter 1055 in the same direction.

The two components of the biphoton state (clockwise and anticlockwise) are then recombined at beam combiner 1055. Depending on the phase difference caused by rotation of the interferometer, the photons are either directed to detector A1 or detector A2. Any change in the phase experienced by the biphoton, will result in a variation in detection at rate A1 that varies with half the single photon wavelength. Thus, the use of the two photon sagnac interferometer can double the accuracy with which the rotation or motion is detected.

Figure 22:
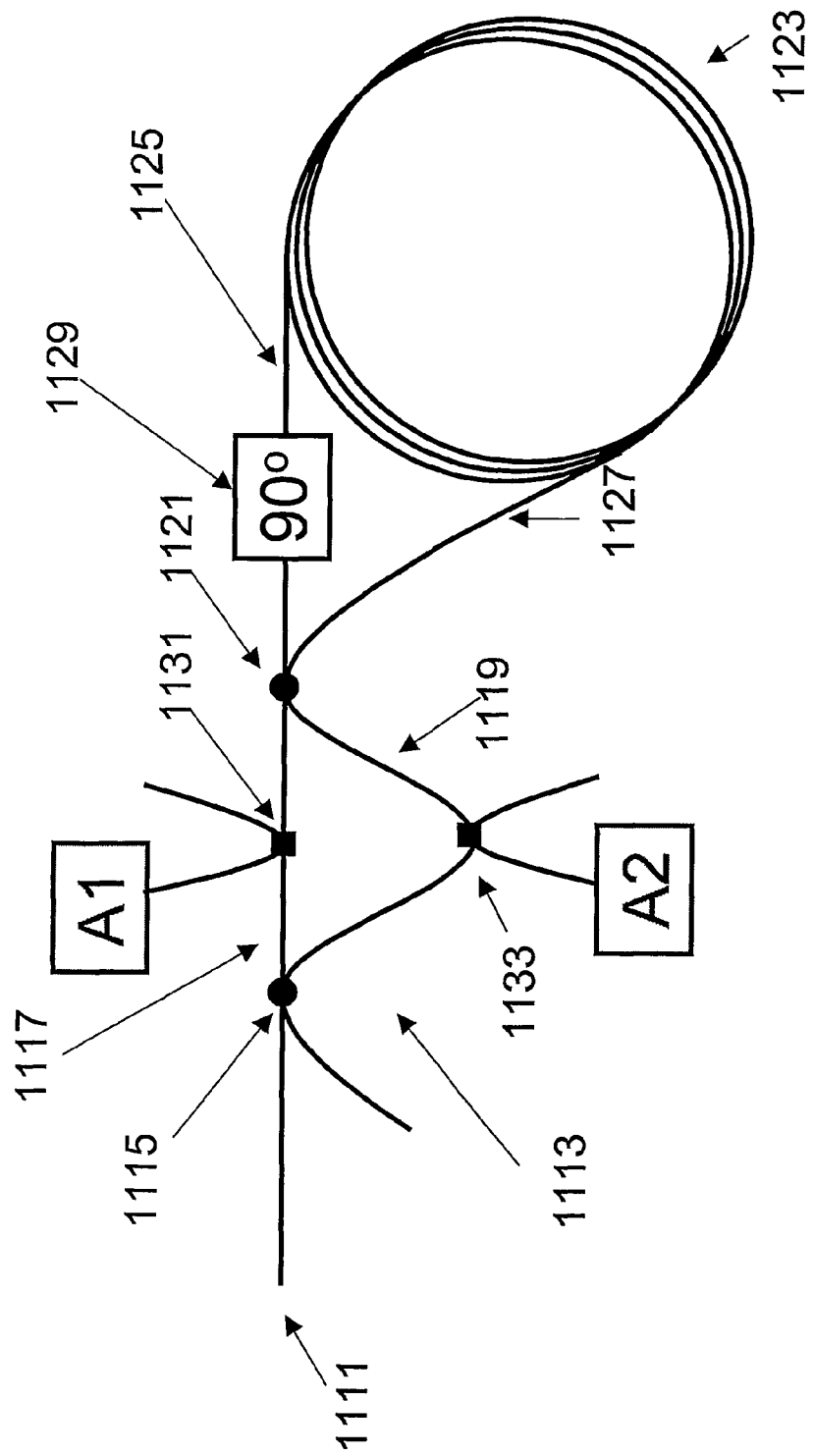
FIG. 22 is a further variation of a sagnac gyroscope in accordance with a further embodiment of the present intention.

FIG. 22 based upon the system shown in FIG. 20. In FIG. 20 a birefringent phase modulator 1029 introduces a phase shift between the biphoton which is incident on beamsplitter 1021 from the left relative to the biphoton incident from the right. Instead, in FIG. 21 the rotational velocity of the fibre loops 1123 introduces a phase shift between the clockwise and anticlockwise travelling components of the biphoton.

In detail, indistinguishable horizontally polarised photons are produced by source 1111. These photons are then fed into unbalanced mach-zehnder interferometer 1113. The interferometer 1113 is an unbalanced interferometer with a short arm 1117 and a long arm 1119. Thus, if the first photon takes the long arm 1113 and the second photon the short arm 1117 they will impinge on the beamsplitter 11121 at the same time and two photon interference will occur. This means that beam splitter 1121 either directs a biphoton (both photons) down arm 1125 or a biphoton down arm 1027. The photons within sagnac interferometer 1123 have a superposition of two states, in the first state, they follow path 1127 and proceed around loops anticlockwise and then enter polarisation rotor 1129 and have a vertically polarised rotation as they reach exit point 1121. Photons which pass round the interferometer in the clockwise direction enter via path 1125 and pass first through polarisation rotor 1129. These photons also exit the interferometer 1123 via beam combiner/splitter 1121. The photons at this point have a vertical polarisation and dependent on the phase difference introduced in sagnac interferometer 1123 either reach biphoton detector A1 or A2.

Thus, the two photon sagnac interferometer described above doubles the accuracy with which rotational motion is detected.

The invention claimed is:

1. An optical system configured to generate entangled photon states, the system comprising
   a non-classical single photon source configured to output identical photons separated by a time interval; and
   an interferometer comprising,
   a first path through said interferometer and second path through said interferometer,
   first directing elements configured to direct photons to follow the first path,
   second directing elements configured to direct photons to follow the second path, wherein in said second path the photons travel through said interferometer in a direction opposite to a direction through which the photons travel through said interferometer in said first path; and
   a phase shifter configured to vary the relative phase shift between photons following the first path and photons following the second path,
   the system being configured such that photons travelling through the first path have a different polarisation to those travelling through the second path, wherein a difference in path length between the first path and the second path is equal to the said time interval; and the system further comprising:
   a first detector for detecting photons which have followed said first path, a second detector for detecting photons which have followed said second path, and a processor configured to determine correlation between the results of said first and second detectors in order to select photons which have been entangled with the generated state.

2. An optical system according to claim 1, wherein said first path comprises a plurality of sub-paths connected in parallel and said second path comprises the reverse of the plurality of sub-paths.

3. An optical system according to claim 1, wherein said source is configured to output bi-photons and said first directing elements are configured to direct biphotons and said second directing elements are configured to direct bi-photons, and wherein said detectors are configured to detect bi-photons.

4. An optical system according to claim 1, wherein the source is configured to generate a state which is entangled in polarisation and which is a superposition of a first state with a vertically polarised photon and horizontally polarised photon emitted at a first time interval after the vertically polarised photon and a second state with a horizontally polarised photon and a vertically polarised photon emitted after the first time interval.

5. An optical system according to claim 1, wherein the source is configured to emit non-degenerate entangled photons.

6. An optical system according to claim 1, wherein the interferometer further comprises a third path for said photons and a fourth path for photons, wherein in said fourth path the photons travel through said interferometer in a direction opposite to a direction photons which the photons follow through the interferometer in the third path, the system being configured such that photons travelling through the third path have a different polarisation to those travelling through the fourth path and a phase shifter configured to vary the relative phase shift between photons following the third path and photons following the fourth path, the system further comprising a splitter configured to direct photons either along said first path or the third path depending on their polarisation and a splitter configured to direct photons either along said second path or the fourth path depending on their polarisation.

7. An optical system according to claim 1, wherein the element for varying the relative phase shift comprises birefringent elements, a mount configured to moveably mount a sample in at least one path or a mobile mount for the first path and second path.

8. An optical system according to claim 1, configured to perform investigation or imaging of an object, said system comprising a first polarising beam splitter located in said first path configured to direct photons having a first polarisation to impinge on said object and photons having a second polarisation to bypass said object, said beams being recombined at a second polarising beam splitter which also direct photons having a first polarisation to impinge on said object and photons having a second polarisation to bypass said object.

9. An optical system according to claim 1, configured to examine an entangled photon source, said system comprising a source of polarisation entangled photons and being configured to convert said polarisation entanglement into phase entanglement, and to direct, out of a pair of entangled photons, one photon to follow the first path and the other to follow the second path, wherein said phase shifter comprises a phase modulator configured to introduce a phase difference such that it is possible to predict the exits paths of the photons from the first and second paths if said source is fully entangled.

10. A method of interfering photons to produce a generated entangled state, the method comprising generating photons from a non-classical single photon source configured to output identical photons separated by a time interval;

directing said photons outputted by the source into an interferometer having a first path through the interferometer and a second path through the interferometer, including directing photons having a first polarisation to follow said first path while simultaneously directing photons having a second polarisation to follow said second path, wherein in said second path, the photons travel in a direction through the interferometer opposite a direction which photons travel through said interferometer in the first path, wherein a difference in path length between the first path and the second path is equal to the said time interval;

varying the relative phase shift between photons following the first path and photons following the second path, detecting photons that have followed said first path, detecting photons that have followed said second path, and measuring the correlation of photons which exit the first and second paths in order to select photons which have been entangled with the generated state.

* * * * *

UNITED STATES PATENT AND TRADEMARK OFFICE
CERTIFICATE OF CORRECTION

| | | |
|---|---|---|
| PATENT NO. | : 8,605,288 B2 | |
| APPLICATION NO. | : 12/600598 | |
| DATED | : December 10, 2013 | |
| INVENTOR(S) | : Anthony John Bennett et al. | |

It is certified that error appears in the above-identified patent and that said Letters Patent is hereby corrected as shown below:

On the title page, Item (73), the Assignee's Information is incorrect. Item (73) should read:

--(73)   Assignee:   Kabushiki Kaisha Toshiba, Tokyo (JP)--

Signed and Sealed this
Twenty-fifth Day of March, 2014

Michelle K. Lee
*Deputy Director of the United States Patent and Trademark Office*